United States Patent
Matsuoka et al.

(10) Patent No.: US 10,471,540 B2
(45) Date of Patent: Nov. 12, 2019

(54) LASER WELDING METHOD

(71) Applicant: Panasonic Intellectual Property Management Co., Ltd., Osaka (JP)

(72) Inventors: Noriyuki Matsuoka, Osaka (JP); Yasushi Mukai, Osaka (JP); Atsuhiro Kawamoto, Hyogo (JP); Junji Fujiwara, Osaka (JP); Tatsuyuki Nakagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 226 days.

(21) Appl. No.: 14/891,215
(22) PCT Filed: Feb. 24, 2015
(86) PCT No.: PCT/JP2015/000894
§ 371 (c)(1),
(2) Date: Nov. 13, 2015
(87) PCT Pub. No.: WO2015/129248
PCT Pub. Date: Sep. 3, 2015

(65) Prior Publication Data
US 2016/0354867 A1    Dec. 8, 2016

(30) Foreign Application Priority Data
Feb. 25, 2014    (JP) ................. 2014-033756

(51) Int. Cl.
| | | |
|---|---|---|
| *B23K 26/24* | (2014.01) | |
| *B23K 26/082* | (2014.01) | |
| *B23K 26/06* | (2014.01) | |
| *B23K 26/08* | (2014.01) | |
| *B23K 26/322* | (2014.01) | |
| *B23K 101/34* | (2006.01) | |
| *B23K 103/04* | (2006.01) | |
| *B23K 103/08* | (2006.01) | |

(52) U.S. Cl.
CPC .......... *B23K 26/24* (2013.01); *B23K 26/0626* (2013.01); *B23K 26/082* (2015.10);
(Continued)

(58) Field of Classification Search
CPC .... B23K 26/28; B23K 26/0626; B23K 26/24; B23K 26/082; B23K 26/0876;
(Continued)

(56) References Cited

U.S. PATENT DOCUMENTS

| | | |
|---|---|---|
| 5,595,670 A | 1/1997 | Mombo-Caristan |
| 5,879,416 A | 3/1999 | Nakamura et al. |

(Continued)

FOREIGN PATENT DOCUMENTS

| | | |
|---|---|---|
| JP | 54-116356 | 9/1979 |
| JP | 61-169184 | 7/1986 |

(Continued)

OTHER PUBLICATIONS

International Search Report of PCT application No. PCT/JP2015/000894 dated May 19, 2015.

*Primary Examiner* — Dana Ross
*Assistant Examiner* — Joseph M Baillargeon
(74) *Attorney, Agent, or Firm* — Wenderoth, Lind & Ponack, L.L.P.

(57) ABSTRACT

A laser welding method of the present disclosure includes the step of irradiating a workpiece with a laser beam in a helical shape along a weld part of the workpiece. The helical shape is a combination of a circular trajectory in which a laser beam is moved circularly, and a movement trajectory in which the laser beam is moved in a proceeding direction along the weld part. Furthermore, first energy of the laser beam moving so as to have a component of the proceeding direction in the circular trajectory is larger than second energy of the laser beam moving so as to have a component of an opposite direction to the proceeding direction in the circular trajectory.

13 Claims, 24 Drawing Sheets

(52) U.S. Cl.
CPC ........ *B23K 26/0876* (2013.01); *B23K 26/322* (2013.01); *B23K 2101/34* (2018.08); *B23K 2101/35* (2018.08); *B23K 2103/04* (2018.08); *B23K 2103/08* (2018.08)

(58) Field of Classification Search
CPC .............. B23K 26/322; B23K 2201/35; B23K 2201/34; B23K 2203/04; B23K 2203/08
USPC .............. 219/121.61–121.69, 121.85, 121.8, 219/121.14, 121.6, 121.79, 121.72
See application file for complete search history.

(56) References Cited

U.S. PATENT DOCUMENTS

| | | | |
|---|---|---|---|
| 6,066,830 A | 5/2000 | Cline et al. | |
| 8,575,512 B2 * | 11/2013 | Hagihara | B23K 26/244 219/121.61 |
| 2003/0121895 A1 | 7/2003 | Sonoda et al. | |
| 2005/0100703 A1 * | 5/2005 | Terada | B29C 65/1635 428/57 |
| 2007/0228023 A1 * | 10/2007 | Kleine | B23K 26/0626 219/121.67 |
| 2012/0255937 A1 * | 10/2012 | Oe | B23K 26/0884 219/121.63 |

FOREIGN PATENT DOCUMENTS

| | | |
|---|---|---|
| JP | 8-192286 | 7/1996 |
| JP | 8-315789 | 11/1996 |
| JP | 10-071480 | 3/1998 |
| JP | 2002-137083 | 5/2002 |
| JP | 2003-200282 | 7/2003 |
| JP | 2003-305581 | 10/2003 |
| JP | 2007-253179 | 10/2007 |
| JP | 2012-218030 | 11/2012 |

* cited by examiner

FIG. 21
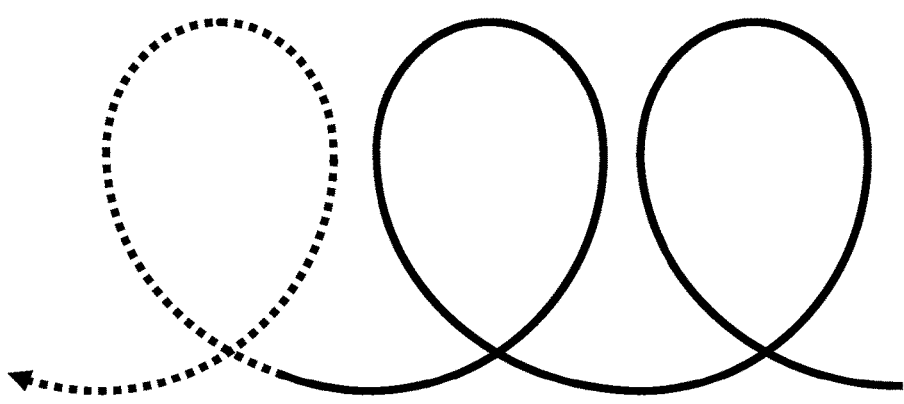
welding proceeding direction

LASER WELDING METHOD

CROSS-REFERENCE TO RELATED APPLICATIONS

This application is a U.S. national stage application of the PCT International Application No. PCT/JP2015/000894 filed on Feb. 24, 2015, which claims the benefit of foreign priority of Japanese patent application 2014-033756 filed on Feb. 25, 2014, the contents all of which are incorporated herein by reference.

TECHNICAL FIELD

The present disclosure relates to a laser welding method for irradiating a workpiece with a laser beam with helical scanning.

BACKGROUND ART

In laser welding, two joined portions of workpieces to be joined are irradiated with a laser beam, so that the workpieces in the irradiated portion melted and joined by energy of the laser beam. Laser welding permits rapid welding because physical contact with a workpiece is not needed. Furthermore, since a laser beam has high energy density, the laser welding permits welding in a state in which influence of heat is limited to a narrow range of a workpiece.

On the other hand, in the laser welding, a bead width that is a region to be welded is narrow. Accordingly, tolerance to deviation from a target of a laser beam is small, and accuracy of a portion to be irradiated with the laser beam in a workpiece is required. Bad accuracy of the portion to be irradiated with the laser beam in the workpiece tends to cause defective fusing due to deviation from the target of the laser beam. In order to cope with this problem, the following methods are known.

For example, PTL 1 describes a laser welding method including forming a V-shaped bevel groove in a workpiece in advance, and irradiating the V-shaped bevel groove with a laser beam. PTL 2 describes a laser welding method of carrying out helical scanning by a laser beam. PTL 3 describes a laser welding method in which rotating scanning by a laser beam is carried out so as to draw a circular or elliptical locus.

CITATION LIST

Patent Literature

PTL 1: Japanese Patent Application Unexamined Publication No. S61-169184
PTL 2: Japanese Patent Application Unexamined Publication No. S54-116356
PTL 3: Japanese Patent Application Unexamined Publication No. H8-192286

SUMMARY OF THE INVENTION

However, in a laser welding method described in PTL 1, a workpiece needs to be beveled in advance, thus increasing man-hour. Furthermore, some workpieces cannot be beveled. In laser welding methods described in PTL 2 and PTL 3, a workpiece melts left-right asymmetrically with respect to a centerline of a region to be irradiated with a laser beam. Therefore, tolerance to deviation from a target of laser beam irradiation becomes also left-right asymmetric. Furthermore, since the workpiece melts left-right asymmetrically, burn-through of the workpiece easily occurs in a region supplied with excessive energy.

In order to dissolve the above-mentioned problems, a laser welding method according to one aspect of the present disclosure includes the step of irradiating a workpiece with a laser beam in a helical shape along a weld part of the workpiece. The helical shape is a combination of a circular trajectory in which a laser beam is moved circularly, and a movement trajectory in which the laser beam is moved in a proceeding direction along the weld part. Furthermore, first energy of the laser beam moving so as to have a component of the proceeding direction in the circular trajectory is larger than second energy of the laser beam moving so as to have a component of an opposite direction to the proceeding direction in the circular trajectory.

Furthermore, a laser welding method in accordance with another aspect of the present disclosure includes the step of irradiating a workpiece with a laser beam in a helical shape along a weld part of the workpiece. The helical shape is a combination of a circular trajectory in which a laser beam is moved circularly, and a movement trajectory in which the laser beam is moved in a proceeding direction along the weld part. Furthermore, third energy of the laser beam in the proceeding direction of the circular trajectory is larger than fourth energy of the laser beam in an opposite direction to the proceeding direction in the circular trajectory.

Furthermore, a laser welding method in accordance with still another aspect of the present disclosure includes the step of irradiating a workpiece with a laser beam in a helical shape along a weld part of the workpiece. The helical shape is a combination of a circular trajectory in which a laser beam is moved circularly, and a movement trajectory in which the laser beam is moved in a proceeding direction along the weld part. Furthermore, third energy of the laser beam in the proceeding direction in the circular trajectory is smaller than fourth energy of the laser beam in an opposite direction to the proceeding direction in the circular trajectory. With the laser welding method of the present disclosure, a workpiece melts equally right and left with respect to the center line of a region to be irradiated with a laser beam. Consequently, the tolerance to deviation from the target of the laser beam irradiation also becomes equal right and left. Furthermore, since the workpiece melts equally right and left, the burn-through of the workpiece can be suppressed.

BRIEF DESCRIPTION OF THE DRAWINGS

FIG. 21 is a view showing a locus of helical irradiation of a laser beam in accordance with the first to fifth exemplary embodiments.

DESCRIPTION OF EXEMPLARY EMBODIMENTS

First Exemplary Embodiment

Figure 1:
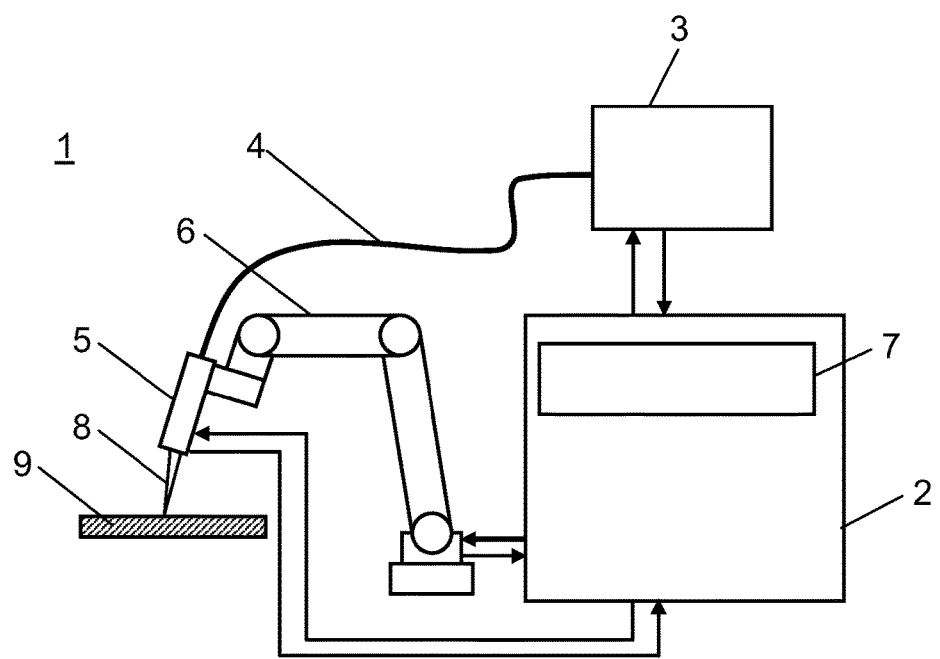
FIG. 1 is a view showing a schematic configuration of a laser welding apparatus in accordance with first to fifth exemplary embodiments.

A configuration of a laser welding apparatus in accordance with this exemplary embodiment is described with reference to FIG. 1. FIG. 1 is a view showing a schematic configuration of laser welding apparatus 1 in accordance with this exemplary embodiment.

In FIG. 1, laser welding apparatus 1 includes control unit 2, laser oscillator 3, optical fiber 4, laser irradiation head 5, and robot 6.

In laser welding apparatus 1, control unit 2 is connected to laser oscillator 3, laser irradiation head 5, and robot 6, and controls operations of laser oscillator 3, laser irradiation head 5, and robot 6. Note here that control unit 2 includes output switching portion 7 for switching energy of a laser beam output by laser oscillator 3. Laser oscillator 3 outputs laser beam 8 based on a command from control unit 2. Optical fiber 4 is connected to laser oscillator 3 and laser irradiation head 5, and transmits laser beam 8 from laser oscillator 3 to laser irradiation head 5. Laser irradiation head 5 is attached to a tip end of an arm of robot 6, and irradiates workpiece 9 with laser beam 8 based on a command from control unit 2. Robot 6 moves laser irradiation head 5 based on a command from control unit 2.

Next, an operation of laser welding apparatus 1 when laser welding is carried out is described with reference to FIG. 1. Laser beam 8 output from laser oscillator 3 enters laser irradiation head 5 through optical fiber 4. Laser irradiation head 5 collects laser beam 8 by a lens (not shown) provided inside, and irradiates workpiece 9 with laser beam 8. Furthermore, laser irradiation head 5 rotates a prism (not shown) provided inside, so that it can rotate and move laser beam 8 so as to have a circular trajectory.

Furthermore, robot 6 moves laser irradiation head 5. This enables an irradiation position of laser beam 8 to be moved in a welding region of workpiece 9. In this way, control unit 2 controls laser oscillator 3, laser irradiation head 5, and robot 6, simultaneously, thus enabling the irradiation position of laser beam 8 to be moved in a helical shape in workpiece 9. Note here that in this exemplary embodiment, laser irradiation head 5 and robot 6 move the irradiation position of laser beam 8. However, the laser welding method of the present disclosure can be also carried out even with the use of a galvano scanner as long as the laser irradiation position can be changed in a helical trajectory.

Figure 2:
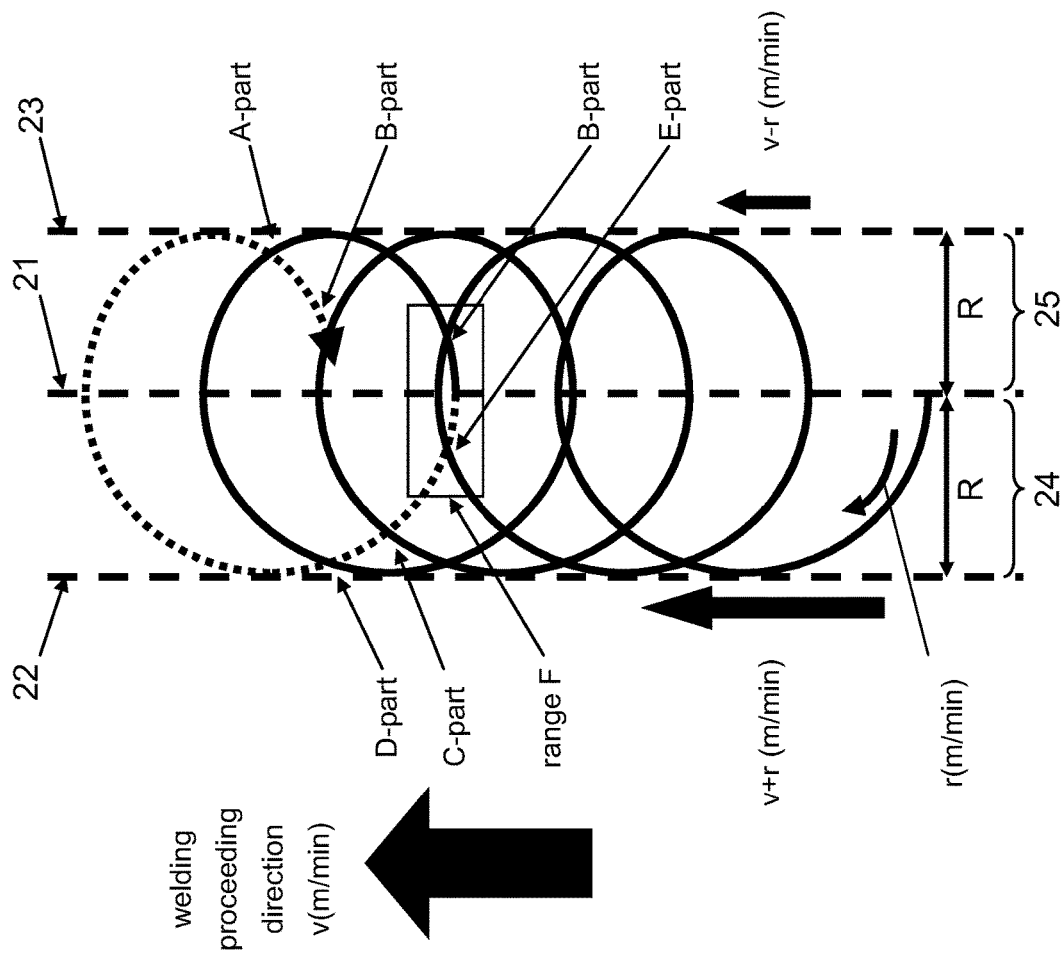
FIG. 2 is a view showing a locus of helical irradiation of a laser beam in accordance with the first to fifth exemplary embodiments.

Next, laser welding for helically irradiating workpiece 9 with laser beam 8 is described with reference to FIG. 2. FIG. 2 is a view showing a locus of helical irradiation of laser beam 8 in accordance with this exemplary embodiment.

Firstly, a method for irradiating workpiece 9 with laser beam 8 in a helical shape is described. Laser irradiation head 5 of laser welding apparatus 1 can move laser beam 8 circularly. That is to say, laser irradiation head 5 can move laser beam 8 so as to draw a "circular trajectory." In FIG. 2, laser beam 8 is moved in a circle having radius R, and in right-handed rotation (clockwise direction). Furthermore, a circular movement speed of laser beam 8 is referred to as r (m/min).

Furthermore, robot 6 of laser welding apparatus 1 can move laser beam 8 in a straight line or a curved line along the weld part. That is to say, robot 6 can move laser beam 8 so as to draw a "movement trajectory" in a welding proceeding direction. In FIG. 2, the irradiation position of laser beam 8 is moved upward along straight middle line 21. Furthermore, the linear movement speed of laser beam 8 is referred to as v (m/min).

When laser beam 8 is moved in the circular trajectory and the movement trajectory simultaneously, the irradiation position of laser beam 8 can be moved helically as shown in FIG. 2. Note here that a region irradiated with laser beam 8 is between left border-line 22 located at the left side with respect to the proceeding direction and right border-line 23 located at the right side with respect to the proceeding direction.

Next, description is given on melting of workpiece 9 in the irradiation region of laser beam 8 when workpiece 9 is irradiated with laser beam 8 in a helical shape.

Firstly, left processing region 24 is described. Left processing region 24 is located at the left side with respect to the welding proceeding direction and between middle line 21 and left border-line 22. An irradiation position of laser beam 8 (hereinafter, simply referred to as an "irradiation position") moves toward the welding proceeding direction while it draws a semicircle by the circular trajectory. That is to say, a drawn locus is an elliptic arc obtained by extending the circular trajectory with radius R in the welding proceeding direction. Furthermore, the speed in the irradiation position at left border-line 22 is v+r (m/min) obtained by adding the circular movement speed to the linear movement speed. Note here that in left processing region 24 including other than left border-line 22, circular movement speed r includes a component of the same direction as that of linear movement speed v.

On the other hand, right processing region 25 is described. Right processing region 25 is located at the right side with respect to the welding proceeding direction and between middle line 21 and right border-line 23. The irradiation position returns to the opposite direction to the welding proceeding direction while it draws a semicircle portion by the circular trajectory. That is to say, a drawn locus is an elliptic arc obtained by reducing the circular trajectory with radius R in the welding proceeding direction. Furthermore, the speed in the irradiation position at right border-line 23 is v−r (m/min) obtained by subtracting the circular movement speed from the linear movement speed. Note here that in right processing region 25 including other than right border-line 23, circular movement speed r includes a component of the opposite direction to that of linear movement speed v.

In other words, when welding is carried out by helical irradiation of laser beam 8, in left processing region 24 located at the left side to the welding proceeding direction, the trajectory of the irradiation position is a large elliptic arc, so that a molten pool of the workpiece by laser beam 8 is easily cooled. On the other hand, since right processing region 25 located at the right side to the welding proceeding direction has the trajectory of the irradiation position having a small elliptic arc, it is easily filled with heat from laser beam 8. Consequently, burn-through of workpiece 9 occurs more easily in the right side with respect to the welding proceeding direction. Therefore, the tolerance to deviation from the target of laser beam 8 becomes narrower at the right side with respect to the welding proceeding direction.

Next, a part (position) in which burn-through occurs more easily in workpiece 9 is described. In laser welding including helical irradiation of laser beam 8, some parts, which have been once irradiated with laser beam 8, are irradiated with laser beam 8 again. Such parts include A-part, B-part, C-part, D-part, E-part, and the like, in FIG. 2. In a range F including the B-part and E-part, the B-part and the E-part, which are portions to be irradiated again with laser beam 8, are adjacent to each other. Further, the range F is located in the middle of the welding region. Accordingly, the range F does not easily release heat to the periphery, and is filled with heat extremely easily. In other words, heat input is the largest and the burn-through easily occurs in a range F part. Furthermore, since both the A-part and the B-part are also in the right side with respect to the welding proceeding direction as mentioned above, they are easily filled with heat, so that the burn-through easily occurs. On the other hand, since the C-part and the D-part are in the left side with respect to the welding proceeding direction as mentioned above, a molten pool, which once has been formed by irradiation of laser beam 8, is easily cooled and the burn-through does not easily occur. That is to say, the burn-through occurs more likely in the A-part, B-part, and E-part than in the C-part and the D-part. Furthermore, it is known that the absorption rate of laser beam 8 is higher in the liquid phase than in the solid phase. Therefore, when the molten pool, which has been once irradiated with laser beam 8, is irradiated with laser beam 8 again, energy is easily absorbed and the burn-through easily occurs.

Next, a laser welding method in accordance with this exemplary embodiment is described with reference to FIGS. 3 to 11.

The laser welding method in accordance with this exemplary embodiment includes irradiating workpiece 9 with laser beam 8 while helical scanning by laser beam 8 is carried out, and, in addition, changing energy given by laser beam 8 to workpiece 9.

Figure 3:
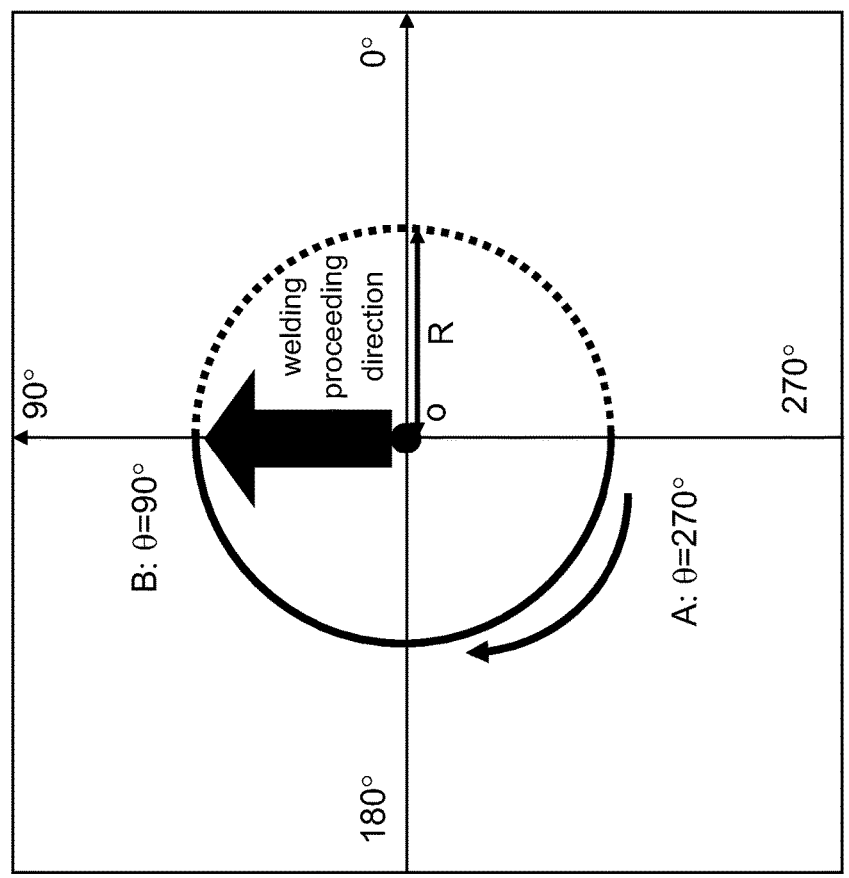
FIG. 3 is a view showing energy of the laser beam in a circular trajectory in accordance with the first exemplary embodiment.

FIG. 3 is a view showing energy of laser beam 8 in the circular trajectory in accordance with this exemplary embodiment. That is to say, FIG. 3 shows a helical trajectory from which a movement trajectory of a movement along the weld part toward the welding proceeding direction is excluded. Herein, parameters of an irradiation pattern of laser beam 8 having the circular trajectory includes a rotation direction, radius R of a circle, coordinate rotation angle θ for specifying the irradiation position of laser beam 8, and a rotation speed (welding speed in the circular trajectory). This exemplary embodiment shows an example in which laser welding is carried out by helically irradiating workpiece 9 with laser beam 8, while laser irradiation head 5 is moved by robot 6. However, movement is not necessarily limited to the movement by laser irradiation head 5 and robot 6, and a galvano scanner may be employed as long as helical irradiation of laser beam 8 can be carried out.

In FIG. 3, a direction in which a coordinate rotation angle θ is 90° is defined as a welding proceeding direction, and the rotation direction is defined as right-handed rotation (clockwise rotation). In this case, as mentioned above, the right side with respect to the welding proceeding direction is easily filled with heat (the side in which the coordinate rotation angle θ is 0°). In FIG. 3, a side which is shown by a dotted line and in which the coordinate rotation angle θ is from 90° (B in FIG. 3) to 270° (A in FIG. 3) (by way of 0° because the direction is clockwise) is the right side with respect to the welding proceeding direction. On the contrary, the left side with respect to the welding proceeding direction is not easily filled with heat (the side in which the coordinate rotation angle θ is 180°). In FIG. 3, a side which is shown by a solid line and in which the coordinate rotation angle θ is from 270° to 90° (by way of 180° because the direction is clockwise) is the left side with respect to the welding proceeding direction. In order to avoid variation in how workpiece 9 melts by irradiation of laser beam 8, a total amount of energy (second energy) from laser beam 8 in the trajectory shown by the dotted line is only required to be smaller than a total amount of energy (first energy) from laser beam 8 in the trajectory shown by the solid line. Furthermore, the trajectory in which the irradiation position of laser beam 8 is shown by a solid line shows a state in which the movement speed in the circular trajectory of laser beam 8 includes a component of the welding proceeding direction. On the contrary, the trajectory in which the irradiation position of laser beam 8 is shown by the dotted line shows a state in which the movement speed in the circular trajectory of laser beam 8 includes a component of an opposite direction to the welding proceeding direction.

Figure 4:
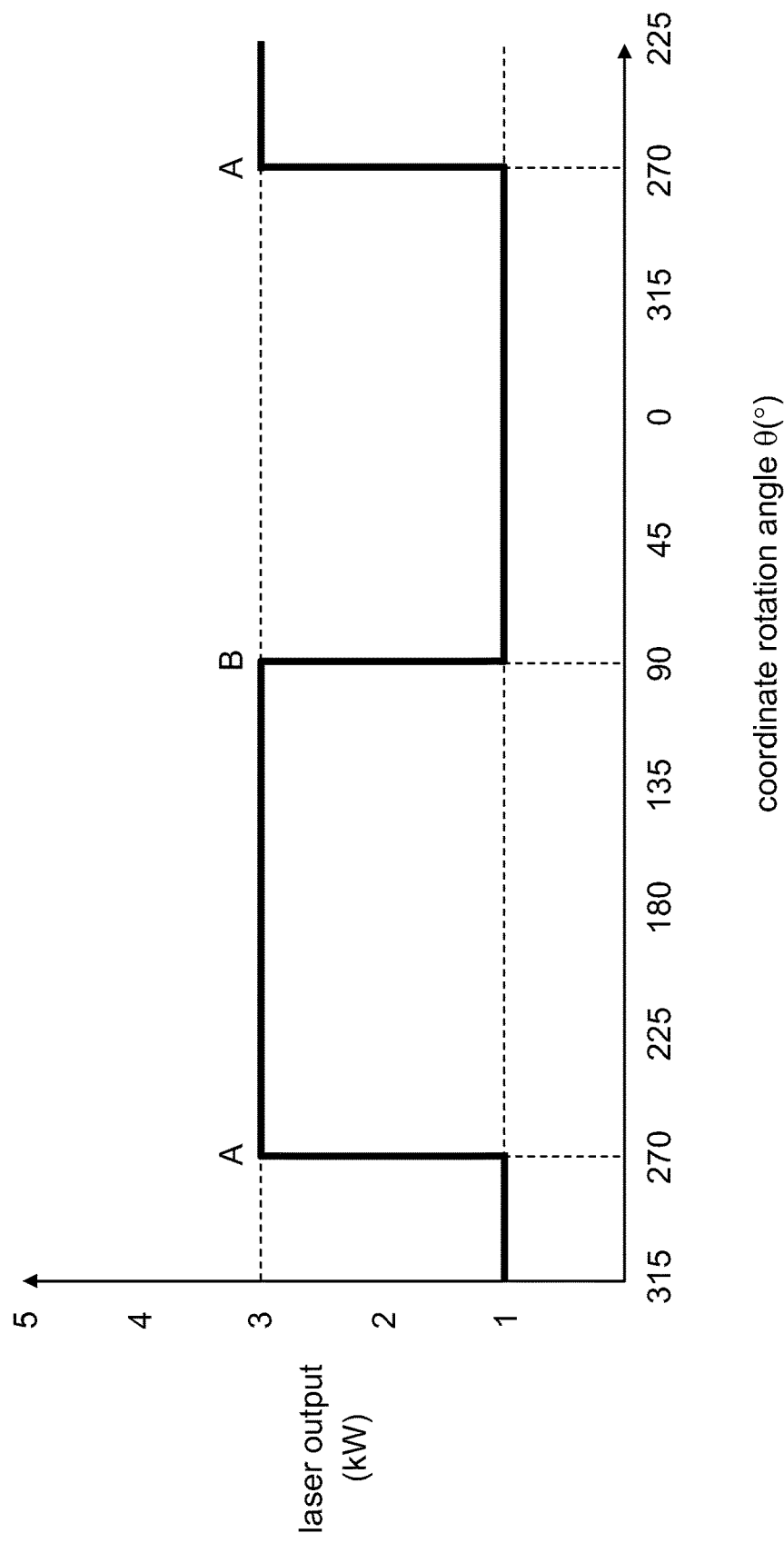
FIG. 4 is a graph showing a waveform of energy of the laser beam, which changes in a rectangular shape with respect to a coordinate rotation angle θ in accordance with the first exemplary embodiment.
Figure 5:
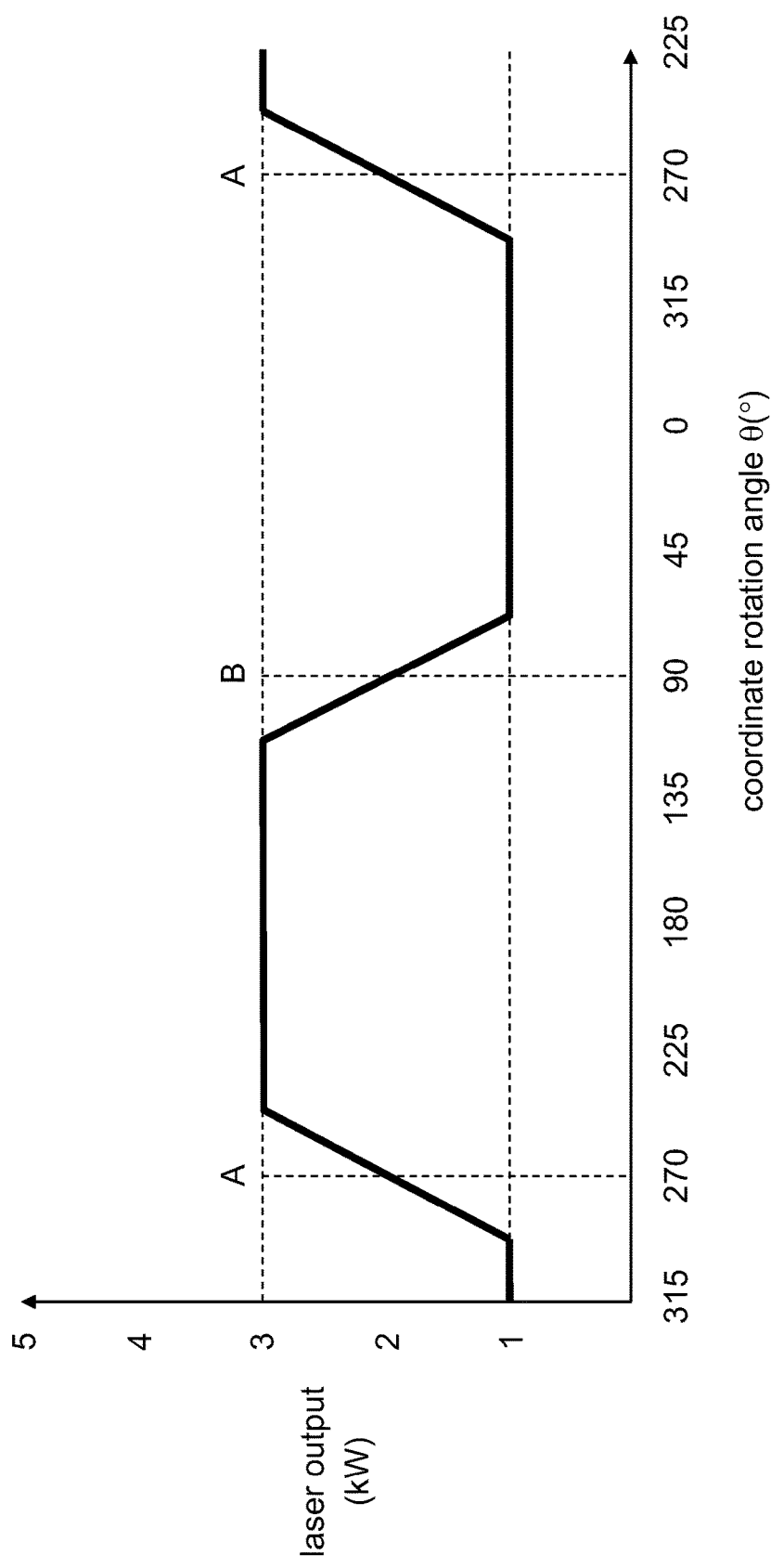
FIG. 5 is a graph showing a waveform of the energy of the laser beam, which changes in a trapezoidal shape with respect to the coordinate rotation angle θ in accordance with the first exemplary embodiment.
Figure 6:
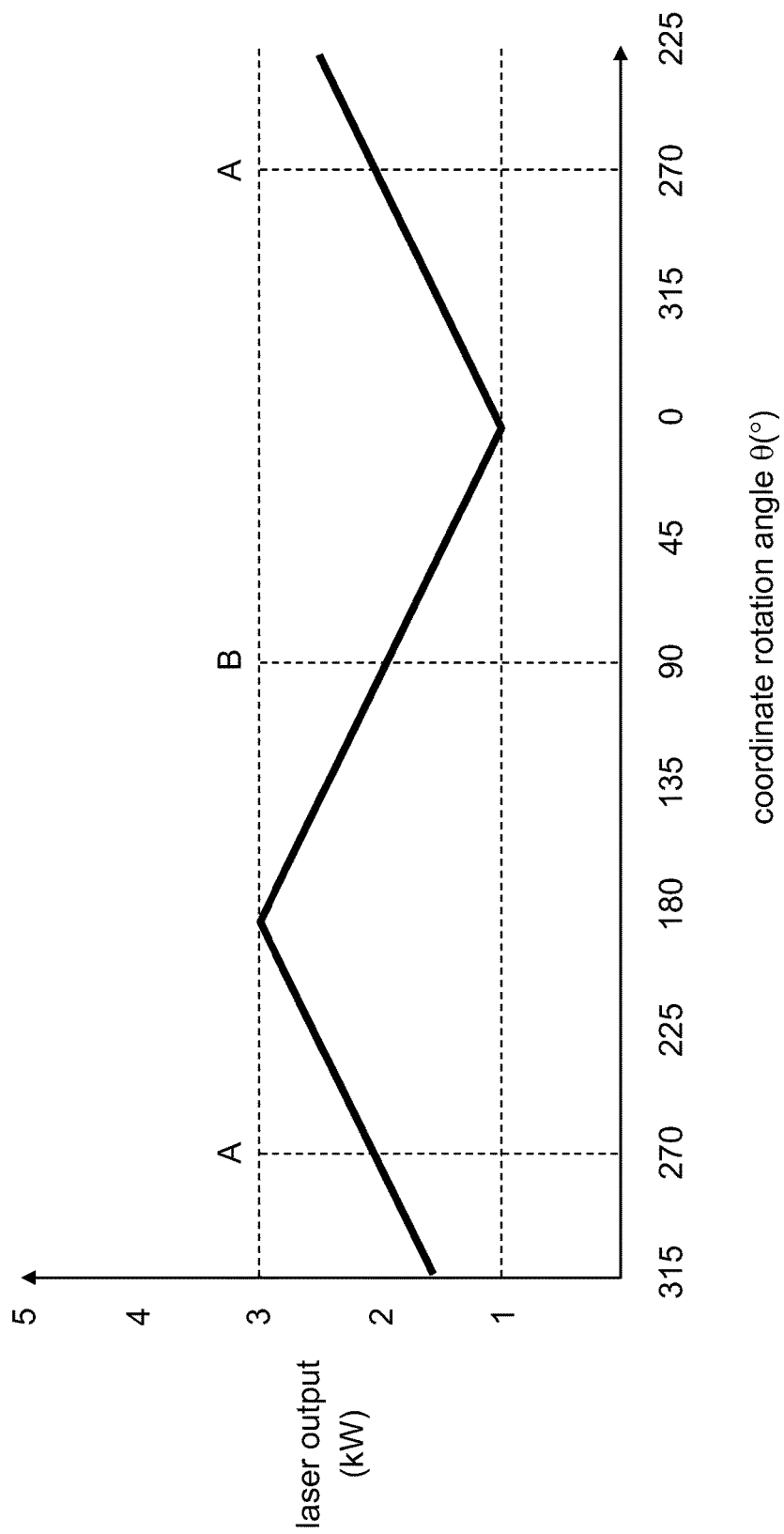
FIG. 6 is a graph showing a waveform of the energy of the laser beam, which changes in a mountain shape with respect to the coordinate rotation angle θ in accordance with the first exemplary embodiment.
Figure 7:
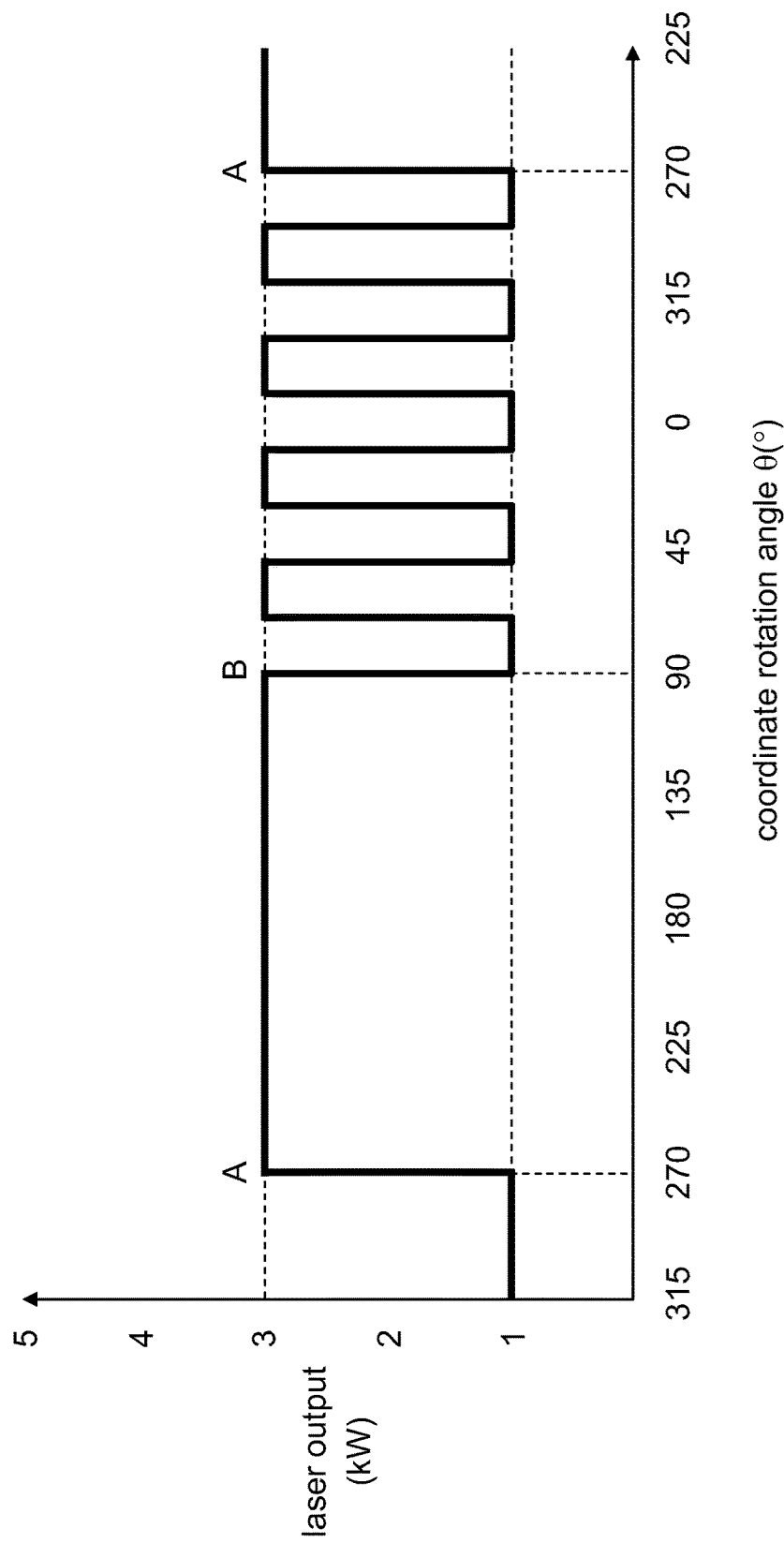
FIG. 7 is a graph showing a waveform of the energy of the laser beam, which combines a pulse wave and a continuous wave with respect to the coordinate rotation angle θ in accordance with the first exemplary embodiment.
Figure 8:
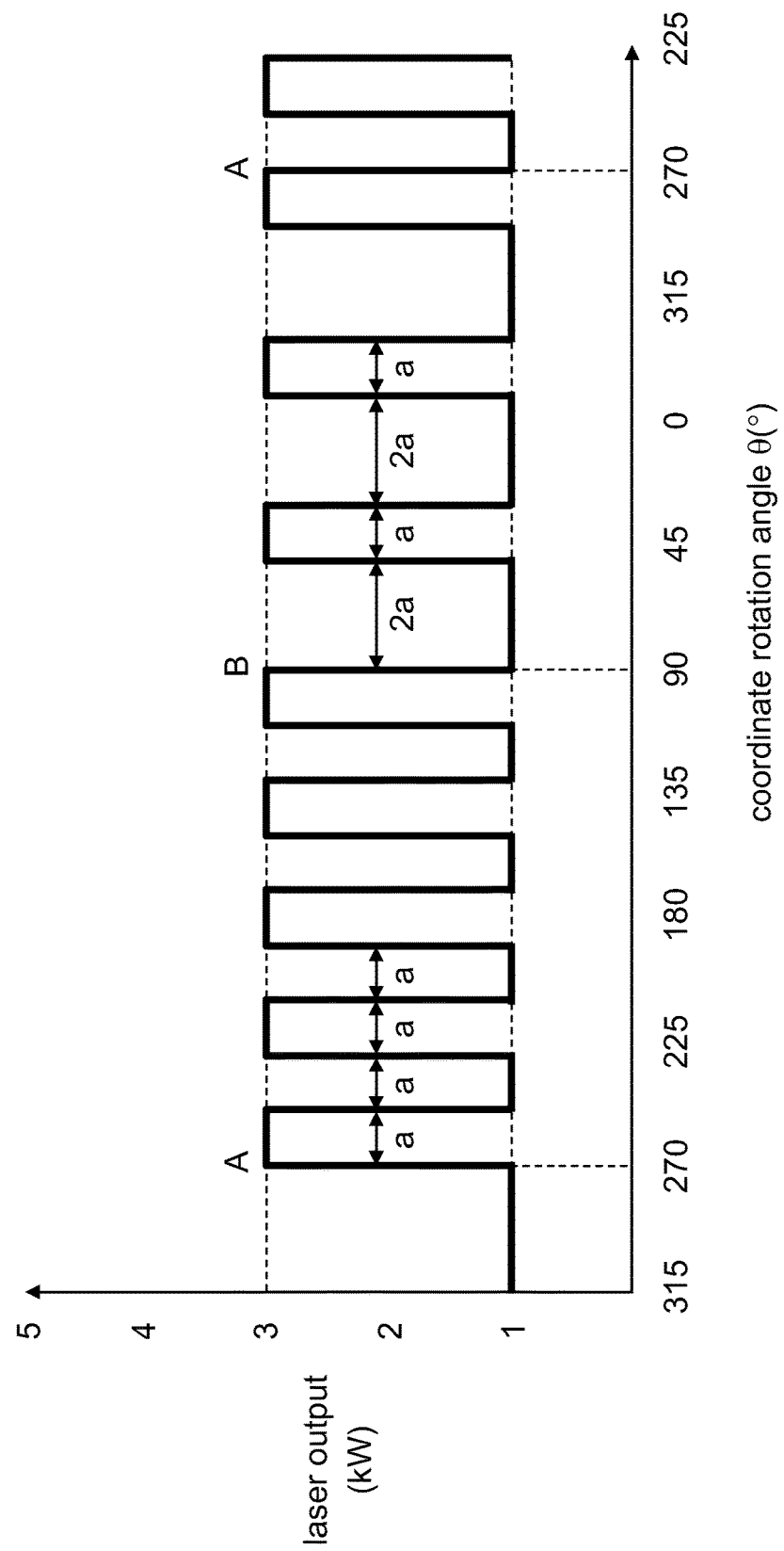
FIG. 8 is a graph showing a waveform of the energy of the laser beam, in which a duty ratio of pulse is changed with respect to the coordinate rotation angle θ in accordance with the first exemplary embodiment.

Next, a method for changing energy of laser beam 8 is described with reference to FIGS. 4 to 8. FIG. 4 is a graph showing a waveform of energy of laser beam 8, which changes in a rectangular shape with respect to a coordinate rotation angle θ. FIG. 5 is a graph showing a waveform of energy of laser beam 8, which changes in a trapezoidal shape with respect to the coordinate rotation angle θ. FIG. 6 is a graph showing a waveform of energy of laser beam 8, which changes in a mountain shape with respect to the coordinate rotation angle θ. FIG. 7 is a graph showing a waveform of energy of laser beam 8, which combines a pulse wave and a continuous wave with respect to the coordinate rotation angle θ. FIG. 8 is a graph showing a waveform of the energy of the laser beam, in which a duty ratio of pulse is changed with respect to the coordinate rotation angle θ.

Firstly, as shown in FIG. 4, control unit 2 controls laser oscillator 3 and laser irradiation head 5 such that a laser output of laser beam 8 is 3 kW when the coordinate rotation angle θ is 270° to 90°, and the laser output of laser beam 8 is 1 kW when the coordinate rotation angle θ is 90° to 270°. That is to say, control unit 2 controls to rotate a prism of laser irradiation head 5 such that a laser output of laser oscillator 3 becomes 1 kW when the coordinate rotation angle θ becomes 90°. Control unit 2 controls to rotate the prism of laser irradiation head 5 and controls such that the laser output of laser oscillator 3 becomes 3 kW when the coordinate rotation angle θ becomes 270°. In this way, when the waveform of the laser output is made to have a rectangular shape, as shown in FIG. 2, a total amount of energy given to left processing region 24 that is the left side with respect to the welding proceeding direction can be made to be larger than a total amount of energy given to right processing region 25 that is the right side with respect to the welding proceeding direction.

Note here that the output of laser beam 8 is preferably determined in advance by, for example, an experiment. Furthermore, since control unit 2 controls an irradiation position of laser irradiation head 5 or an operation of robot 6 based on an operation program, control unit 2 can know the coordinate rotation angle θ, that is, an irradiation position of laser beam 8 in the circular trajectory for itself. Such control permits heat input to workpiece 9 left-right symmetrically with respect to the welding proceeding direction, and the tolerance to deviation from the target also becomes left-right symmetric.

As shown in FIG. 5, a waveform of the laser output may have a trapezoidal shape having 3 kW as the upper limit when the coordinate rotation angle θ is 180°, and 1 kW as the lower limit when the coordinate rotation angle θ is 0°. Thus, as shown in FIG. 2, the total amount of energy given to left processing region 24 can be made to be larger than the total amount of energy given to right processing region 25.

Furthermore, as shown in FIG. 6, a waveform of output of the laser beam may have a mountain shape having 3 kW as the upper limit when the coordinate rotation angle θ is 180°, and 1 kW as the lower limit when the coordinate rotation angle θ is 0°. Thus, as shown in FIG. 2, the total amount of energy given to left processing region 24 can be made to be larger than the total amount of energy given to right processing region 25.

Furthermore, as shown in FIG. 7, a waveform of the output of the laser beam may be a combination of a continuous wave when the coordinate rotation angle θ is 270° to 90°, and a pulse wave when the coordinate rotation angle θ is 90° to 270°. Thus, as shown in FIG. 2, the total amount of energy given to left processing region 24 can be made to be larger than the total amount of energy given to right processing region 25.

Furthermore, as shown in FIG. 8, a waveform of the output of the laser beam may have a pulse shape whose frequency is changed such that a duty ratio when the coordinate rotation angle θ is 270° to 90° is made to be larger than a duty ratio when the coordinate rotation angle θ is 90° to 270°. Thus, as shown in FIG. 2, the total amount of energy given to left processing region 24 can be made to be larger than the total amount of energy given to right processing region 25.

FIGS. 4 to 8 describe energy of laser beam 8 having the upper limit of 3 kW and the lower limit of 1 kW, but not necessarily limited thereto.

Furthermore, the waveform of laser beam 8 is changed in places at the coordinate rotation angles θ of 90° and 270°, but not necessarily limited thereto. For example, the output of the laser beam may be high around the coordinate rotation angle θ of 180°, and low around the coordinate rotation angle θ of 0°. As a result, as shown in FIG. 2, the total amount of energy (first energy) given to left processing region 24 is only required to be larger than the total amount of energy (second energy) given to right processing region 25.

Figure 9:
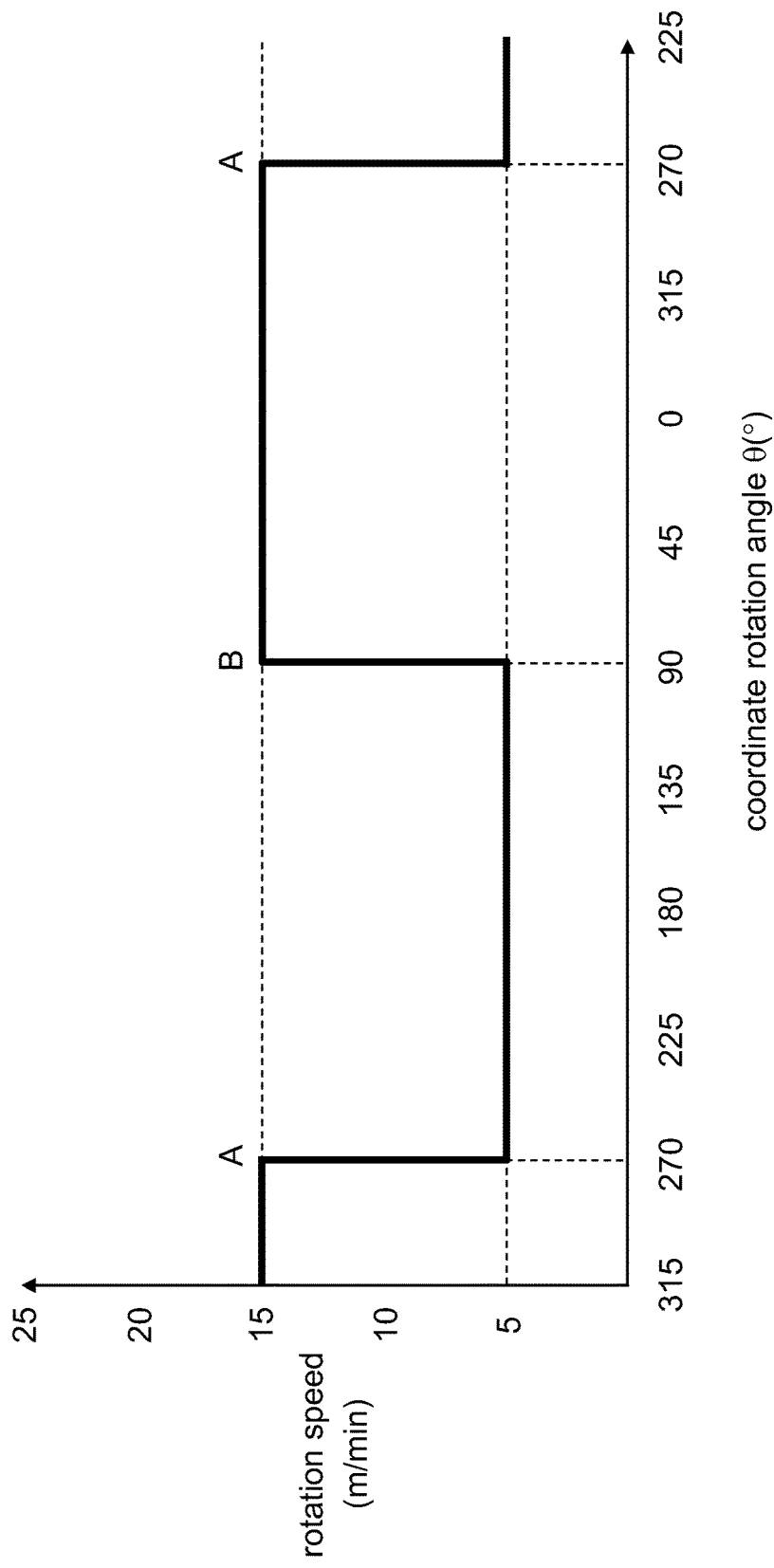
FIG. 9 is a graph showing a waveform of a rotation speed of the laser beam, which changes in a rectangular shape with respect to the coordinate rotation angle θ in accordance with the first exemplary embodiment.
Figure 10:
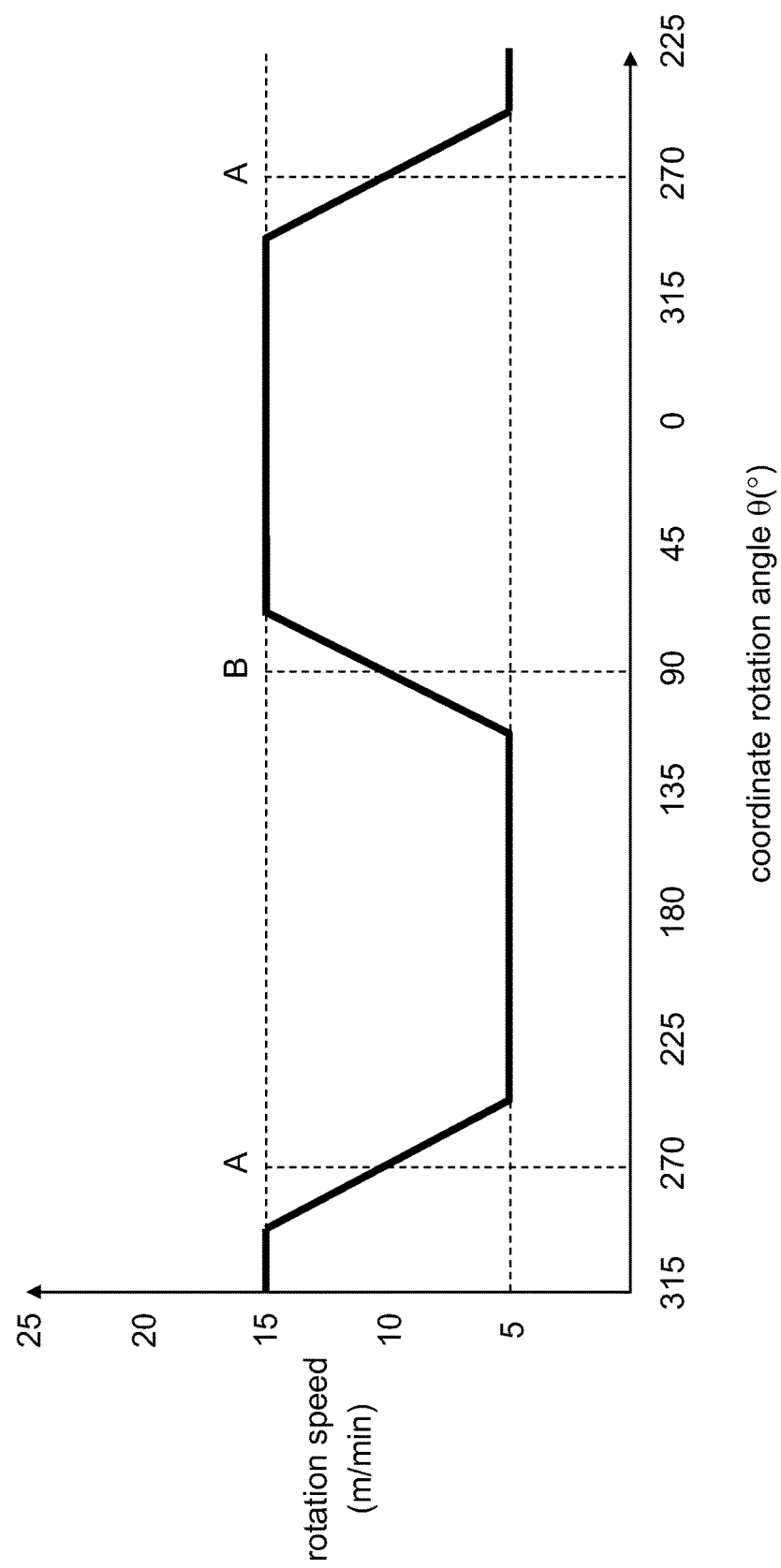
FIG. 10 is a graph showing a waveform of the rotation speed of the laser beam, which changes in a trapezoidal shape with respect to the coordinate rotation angle θ in accordance with the first exemplary embodiment.
Figure 11:
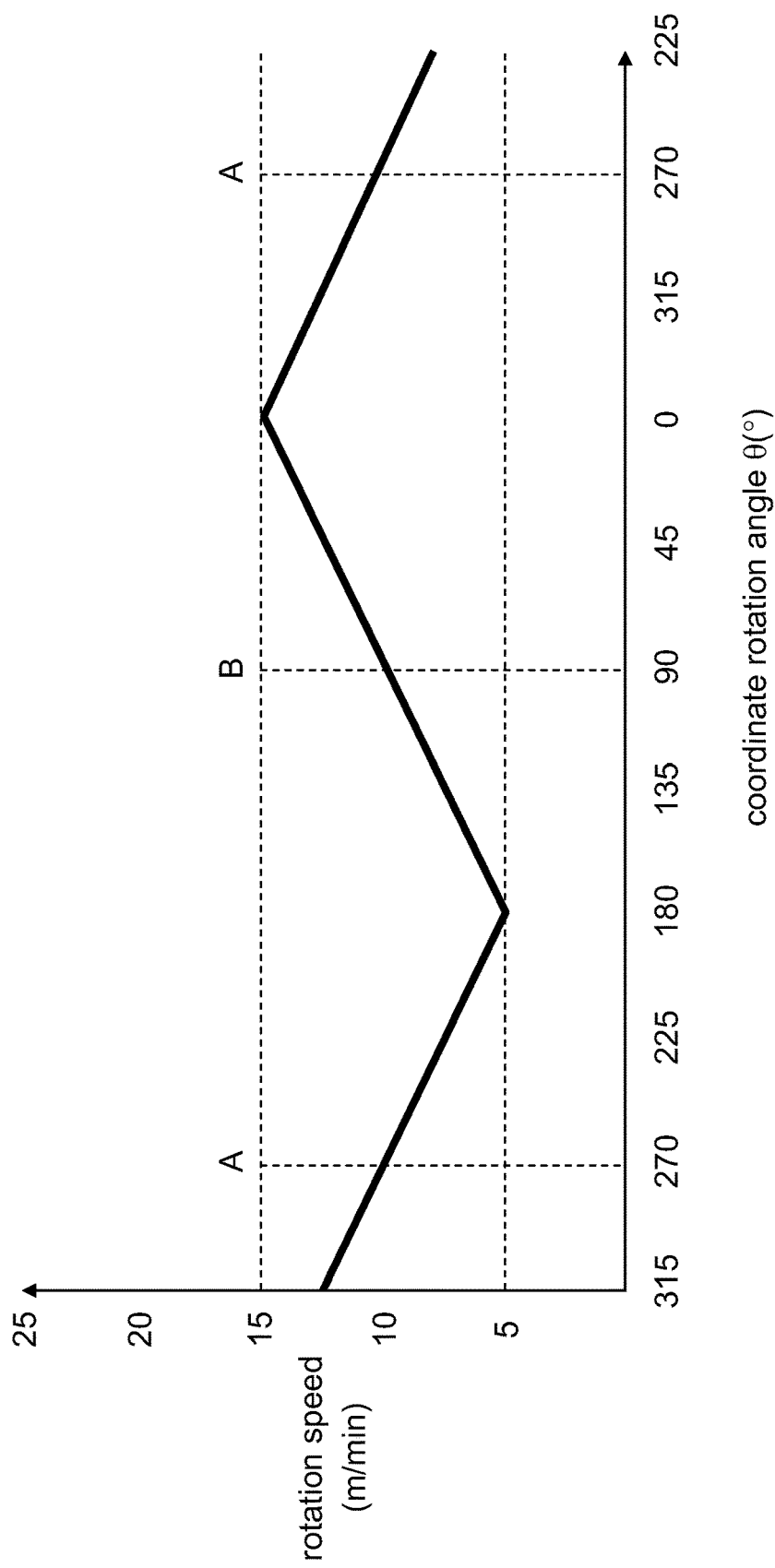
FIG. 11 is a graph showing a waveform of the rotation speed of laser beam-, which changes in a mountain shape with respect to the coordinate rotation angle θ in accordance with the first exemplary embodiment.

Next, a method for switching a rotation speed at the irradiation position of laser beam 8 is described with reference to FIGS. 9 to 11. FIG. 9 is a graph showing a waveform of a rotation speed of laser beam 8, which changes in a rectangular shape with respect to the coordinate rotation angle θ. FIG. 10 is a graph showing a waveform of the rotation speed of laser beam 8, which changes in a trapezoidal shape with respect to the coordinate rotation angle θ. FIG. 11 is a graph showing a waveform of the rotation speed of laser beam 8, which changes in a mountain shape with respect to the coordinate rotation angle θ. When the rotation speed of the laser beam becomes lower, it takes a longer time to move the irradiation position accordingly. As a result, much energy is given.

Firstly, as shown in FIG. 9, control unit 2 controls laser irradiation head 5 such that the rotation speed of laser beam 8 is 5 m/min when the coordinate rotation angle θ is 270° to 90°, and a rotation speed of laser beam 8 is 15 m/min when the coordinate rotation angle θ is 90° to 270°. That is to say, control unit 2 controls to rotate the prism of laser irradiation head 5 such that the rotation speed of laser beam 8 becomes 15 m/min when the coordinate rotation angle θ is 90°, and the rotation speed of laser beam 8 becomes 5 m/min when the coordinate rotation angle θ is 270°. In this way, when the waveform of the rotation speed of laser beam 8 is made to have a rectangular shape, as shown in FIG. 2, the total amount of energy given to left processing region 24 that is the left side with respect to the welding proceeding direction can be made to be larger than the total amount of energy given to right processing region 25 that is the right side with respect to the welding proceeding direction.

Note here that the rotation speed of laser beam 8 may be preferably determined in advance by, for example, an experiment. Furthermore, since control unit 2 controls an operation of the prism of laser irradiation head 5 based on the operation program, control unit 2 itself can know the coordinate rotation angle θ, that is, the irradiation position of laser beam 8 in the actual circular trajectory. Such control permits heat input to workpiece 9 left-right symmetrically with respect to the welding proceeding direction, and the tolerance to deviation from the target also becomes left-right symmetric.

Furthermore, as shown in FIG. 10, the waveform of the rotation speed of laser beam 8 may have a trapezoidal shape showing 5 m/min as the lower limit when the coordinate rotation angle θ is 180°, and 15 m/min as the upper limit when the coordinate rotation angle θ is 0°. Thus, as shown in FIG. 2, the total amount of energy given to left processing region 24 can be made to be larger than the total amount of energy given to right processing region 25.

Furthermore, as shown in FIG. 11, the waveform of the rotation speed of laser beam 8 may have a mountain shape showing 5 m/min as the lower limit when the coordinate rotation angle θ is 180°, and 15 m/min as the upper limit when the coordinate rotation angle θ is 0°. Thus, as shown in FIG. 2, the total amount of energy given to left processing region 24 can be made to be larger than the total amount of energy given to right processing region 25.

FIGS. 9 to 11 describe an example in which the upper limit of the rotation speed of laser beam 8 is 15 m/min and the lower limit thereof is 5 m/min, but not necessarily limited thereto. Furthermore, the rotation speed of laser beam 8 is changed in places at the coordinate rotation angle θ of 90° and 270°, but not necessarily limited thereto. For example, the rotation speed of the laser beam may be slow around the coordinate rotation angle θ of 180°, and fast around the coordinate rotation angle θ of 0°. As a result, as shown in FIG. 2, the total amount of energy (first energy) given to left processing region 24 is only required to be larger than the total amount of energy (second energy) given to right processing region 25.

Thus, the workpiece melts equally right and left with respect to the center line of a region to be irradiated with a laser beam. Consequently, the tolerance to deviation from the target of laser beam irradiation also becomes equal right and left. Furthermore, since the workpiece melts equally right and left, the burn-through of the workpiece can be suppressed.

Note here that the laser welding method in accordance with this exemplary embodiment can be applied to laser welding of a butt joint of butting workpieces 9 against each other, a lap joint of displacing and lapping workpieces 9 on each other, or the like. Moreover, the laser welding method can be also applied to laser welding for a butt joint or a lap joint, having different plate thicknesses.

Second Exemplary Embodiment

Next, a second exemplary embodiment of the present disclosure is described with reference to FIGS. 12 to 20. In this exemplary embodiment, the same reference numerals are given to the same parts of the first exemplary embodiment, and detail description thereof is omitted. The second exemplary embodiment is different from the first exemplary embodiment in that the second exemplary embodiment further considers energy of a laser beam in the forward-and-backward direction of the welding proceeding direction.

The first exemplary embodiment describes the laser welding method in which heat input by irradiation of a laser beam is carried out left-right symmetrically in the right-and-left direction with respect to the welding proceeding direction. In this exemplary embodiment, heat input by irradiation of a laser beam in the forward-and-backward direction of the welding proceeding direction is controlled. It is not necessarily intended that the heat input by irradiation of a laser beam is carried out symmetrically in the forward-and-backward direction of the welding proceeding direction, but intended to obtain balance of suitable heat input in the forward-and-backward direction.

Unmelted workpiece 9 is irradiated with laser beam 8 in the front side in the welding proceeding direction. Melted workpiece 9 or heated workpiece 9 is irradiated with laser beam 8 in the rear side in the welding proceeding direction. Therefore, it is preferable that heat input to an unmelted portion is enhanced and heat input to a melted portion or a heated portion is suppressed. That is to say, it is preferable that energy (third energy) of a laser beam in the front side in the welding proceeding direction, that is, in the range of the coordinate rotation angle θ of 180° to 0° (by way of 90° because the direction is clockwise) is larger than energy (fourth energy) of a laser beam in the rear side in the welding proceeding direction, that is, in the range of the coordinate rotation angle θ of 0° to 180° (by way of 270° because the direction is clockwise).

Figure 12:
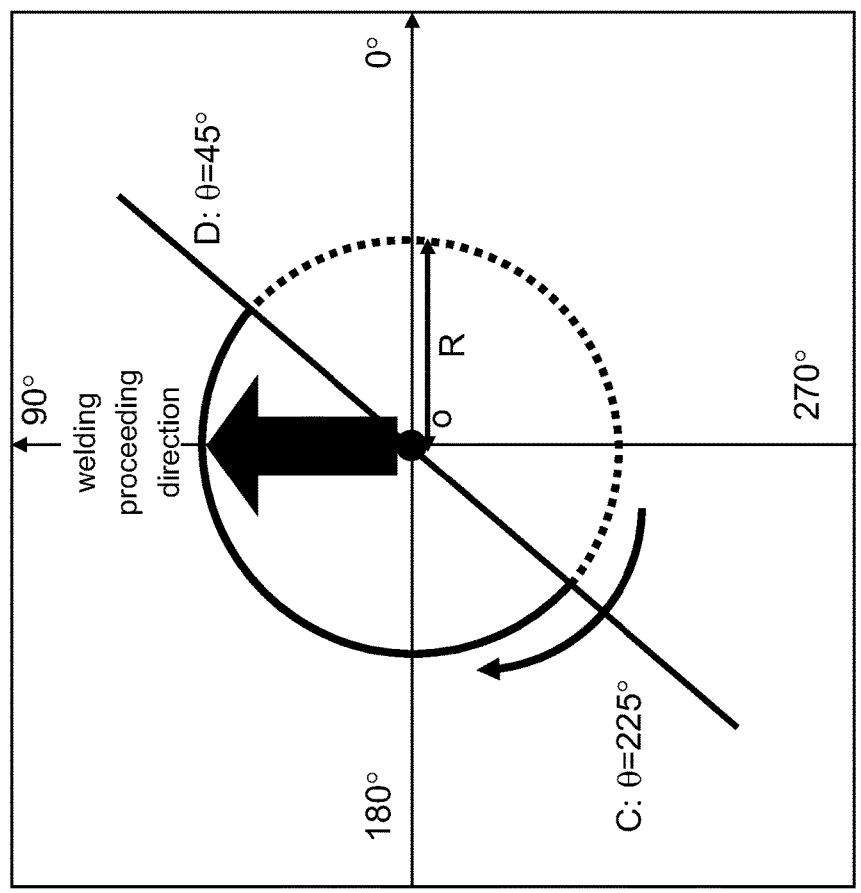
FIG. 12 is a view showing energy of a laser beam in a circular trajectory in accordance with a second exemplary embodiment.
Figure 13:
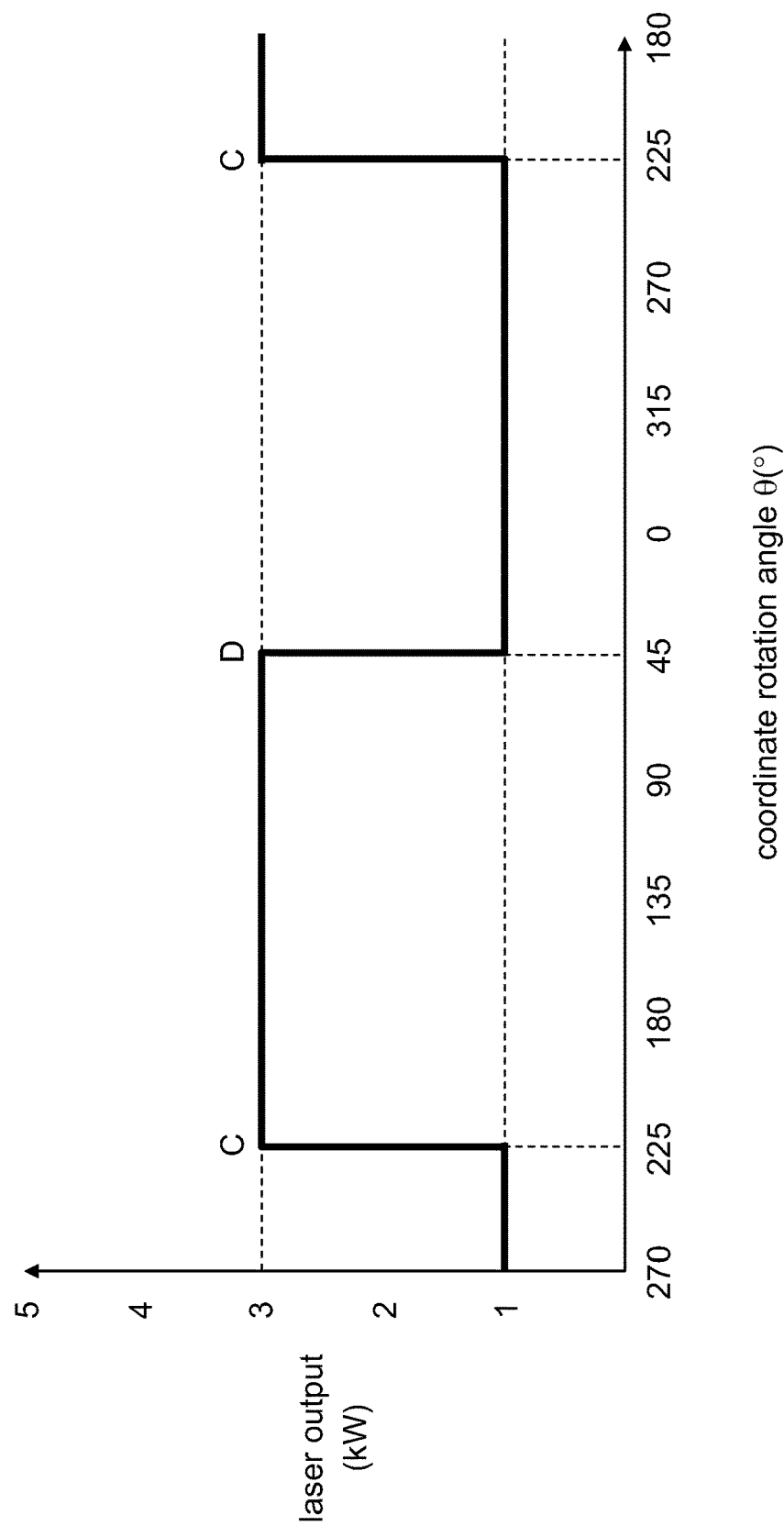
FIG. 13 is a graph showing a waveform of energy of the laser beam, which changes in a rectangular shape with respect to a coordinate rotation angle θ in accordance with the second exemplary embodiment.
Figure 14:
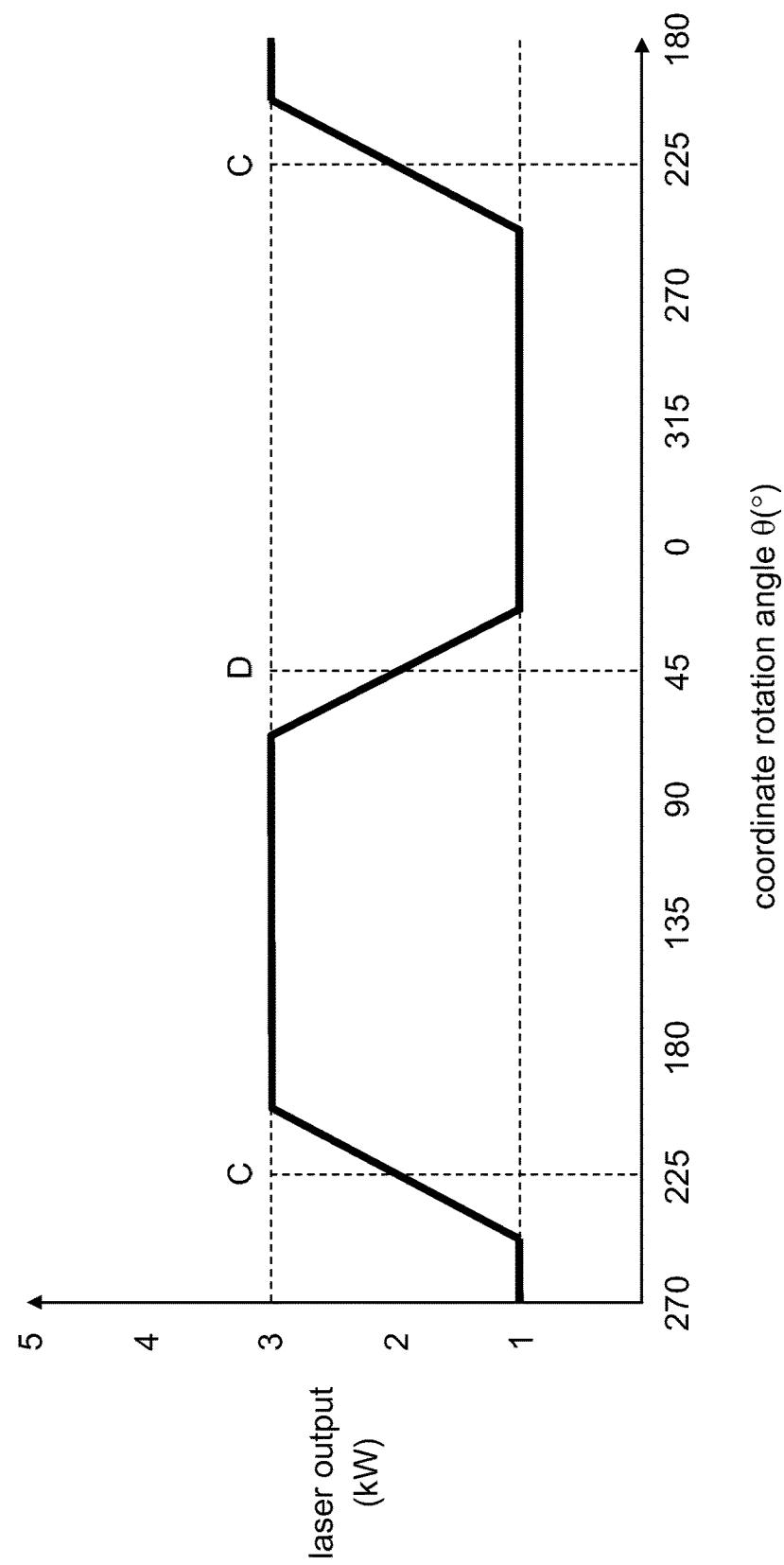
FIG. 14 is a graph showing a waveform of energy of the laser beam, which changes in a trapezoidal shape with respect to the coordinate rotation angle θ in accordance with the second exemplary embodiment.
Figure 15:
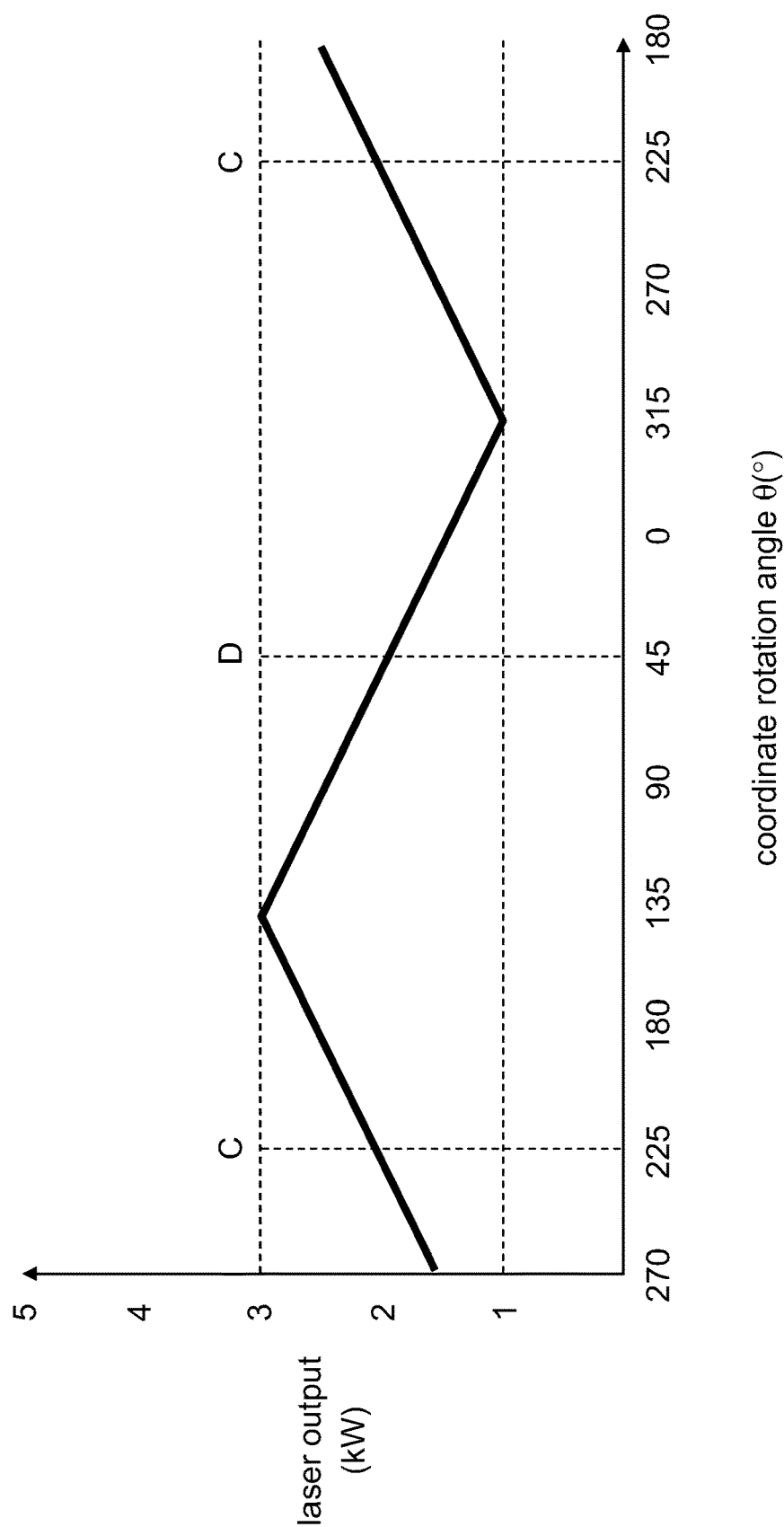
FIG. 15 is a graph showing a waveform of the energy of the laser beam, which changes in a mountain shape with respect to the coordinate rotation angle θ in accordance with the second exemplary embodiment.
Figure 16:
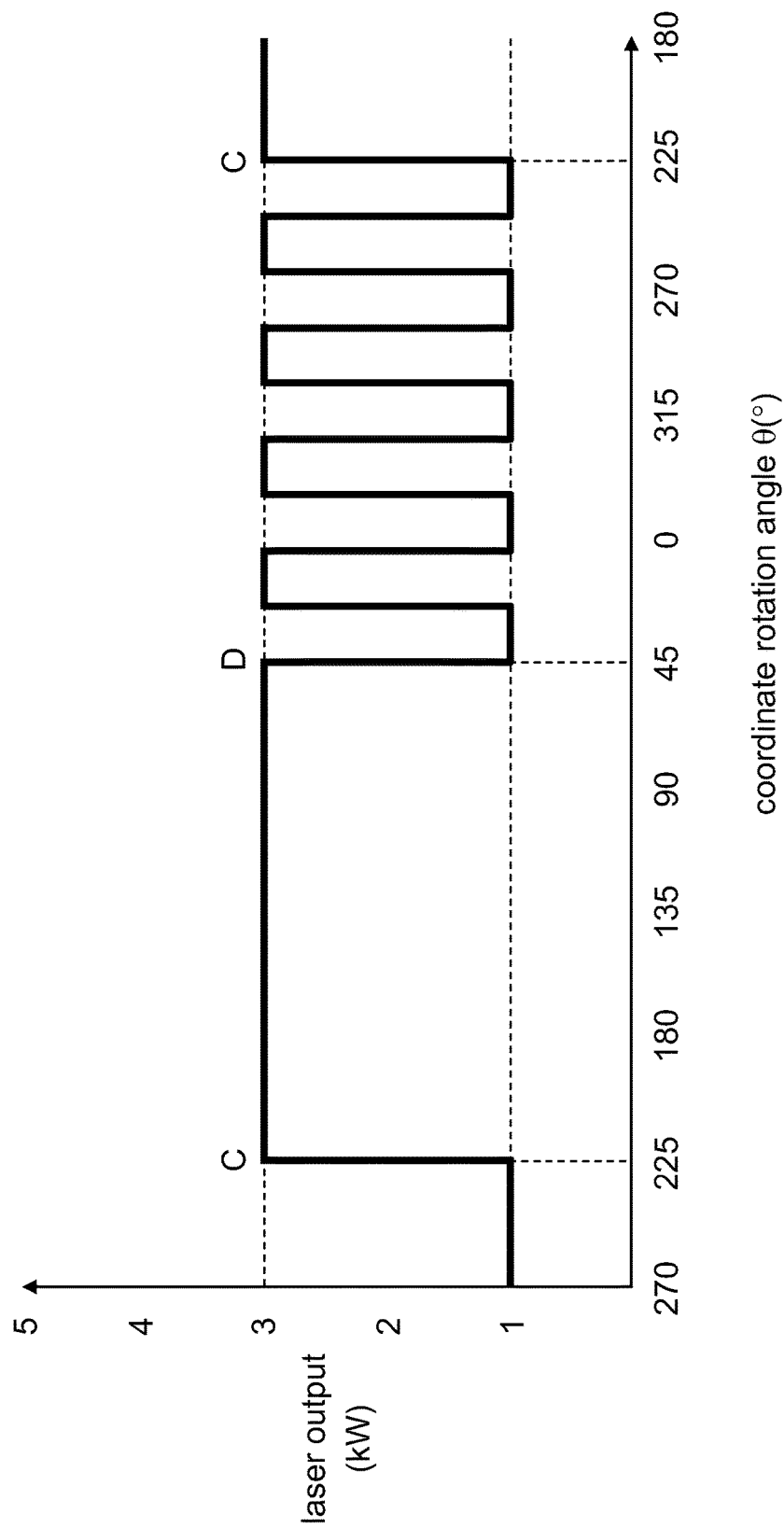
FIG. 16 is a graph showing a waveform of energy of the laser beam, which combines a pulse wave and a continuous wave with respect to the coordinate rotation angle θ in accordance with the second exemplary embodiment.
Figure 17:
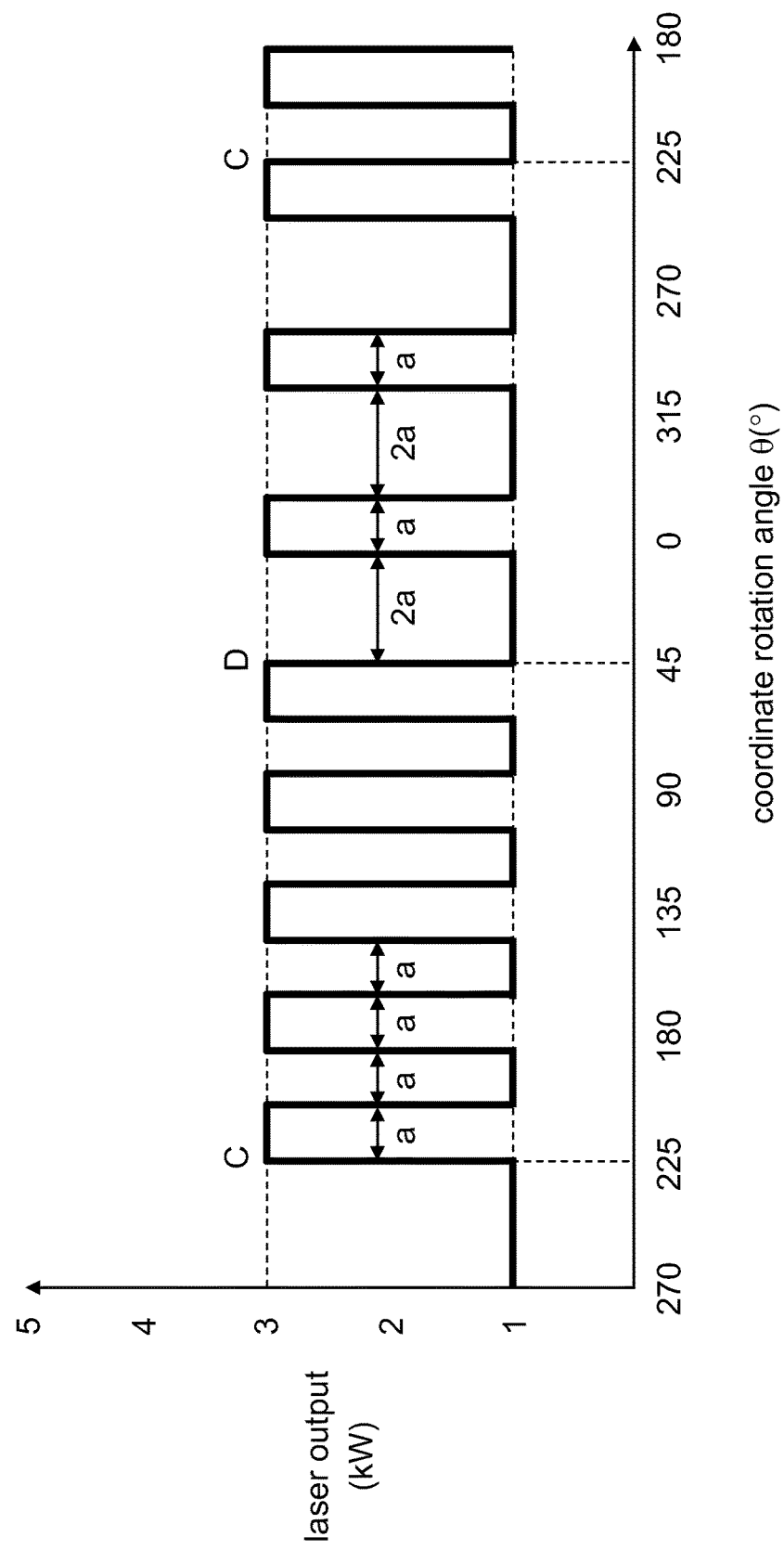
FIG. 17 is a graph showing a waveform of the energy of the laser beam, in which a duty ratio of pulse is changed with respect to the coordinate rotation angle θ in accordance with the second exemplary embodiment.

FIG. 12 is a view showing energy of laser beam 8 in a circular trajectory in accordance with this exemplary embodiment. As shown in FIG. 12, in the laser welding method in accordance with this exemplary embodiment, energy of the laser beam is made higher in the front side in the welding proceeding direction and in the left side with respect to the welding proceeding direction. For example, as shown in FIG. 12, energy of laser beam 8 shown by a solid line in a range of the coordinate rotation angle θ from 225° (C in FIG. 12) to 45° (D in FIG. 12) (by way of 135° because the direction is clockwise) is higher than energy of laser beam 8 shown by a dotted line in a range of the coordinate rotation angle θ from 45° to 225° (by way of 315° because the direction is clockwise).

Figure 18:
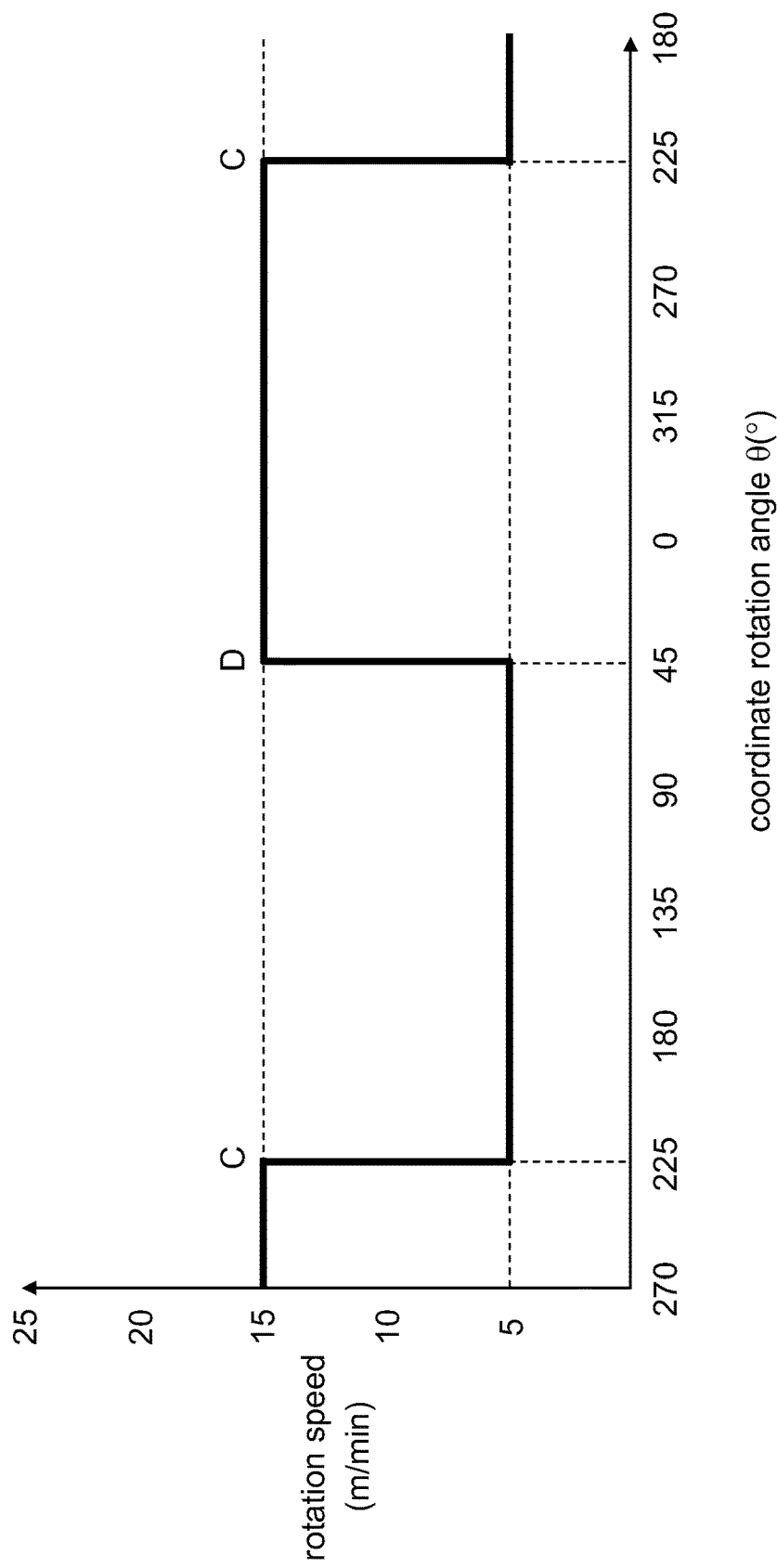
FIG. 18 is a graph showing a waveform of a rotation speed of the laser beam, which changes in a rectangular shape with respect to the coordinate rotation angle θ in accordance with the second exemplary embodiment.
Figure 19:
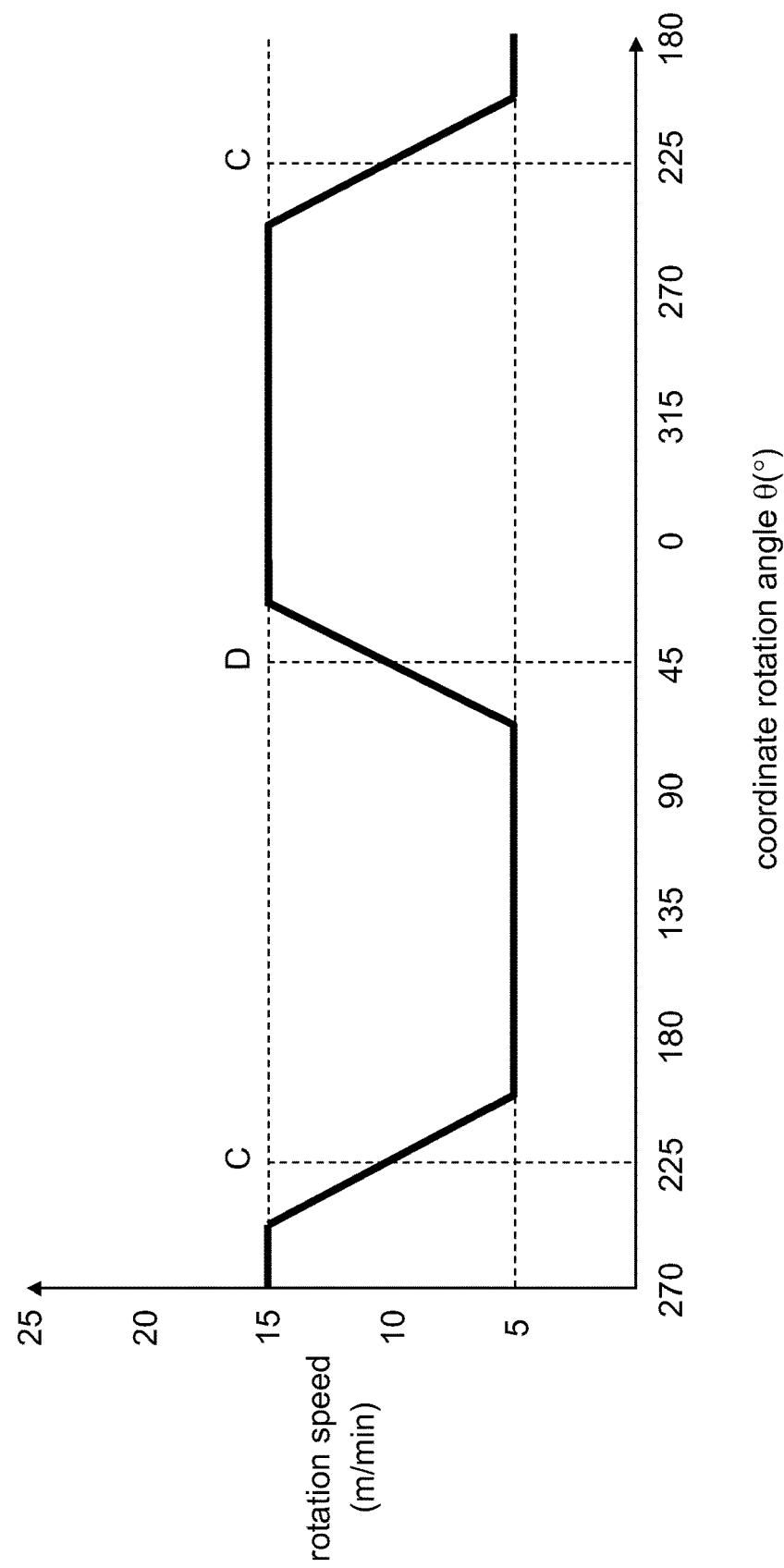
FIG. 19 is a graph showing a waveform of the rotation speed of the laser beam, which changes in a trapezoidal shape with respect to the coordinate rotation angle θ in accordance with the second exemplary embodiment.
Figure 20:
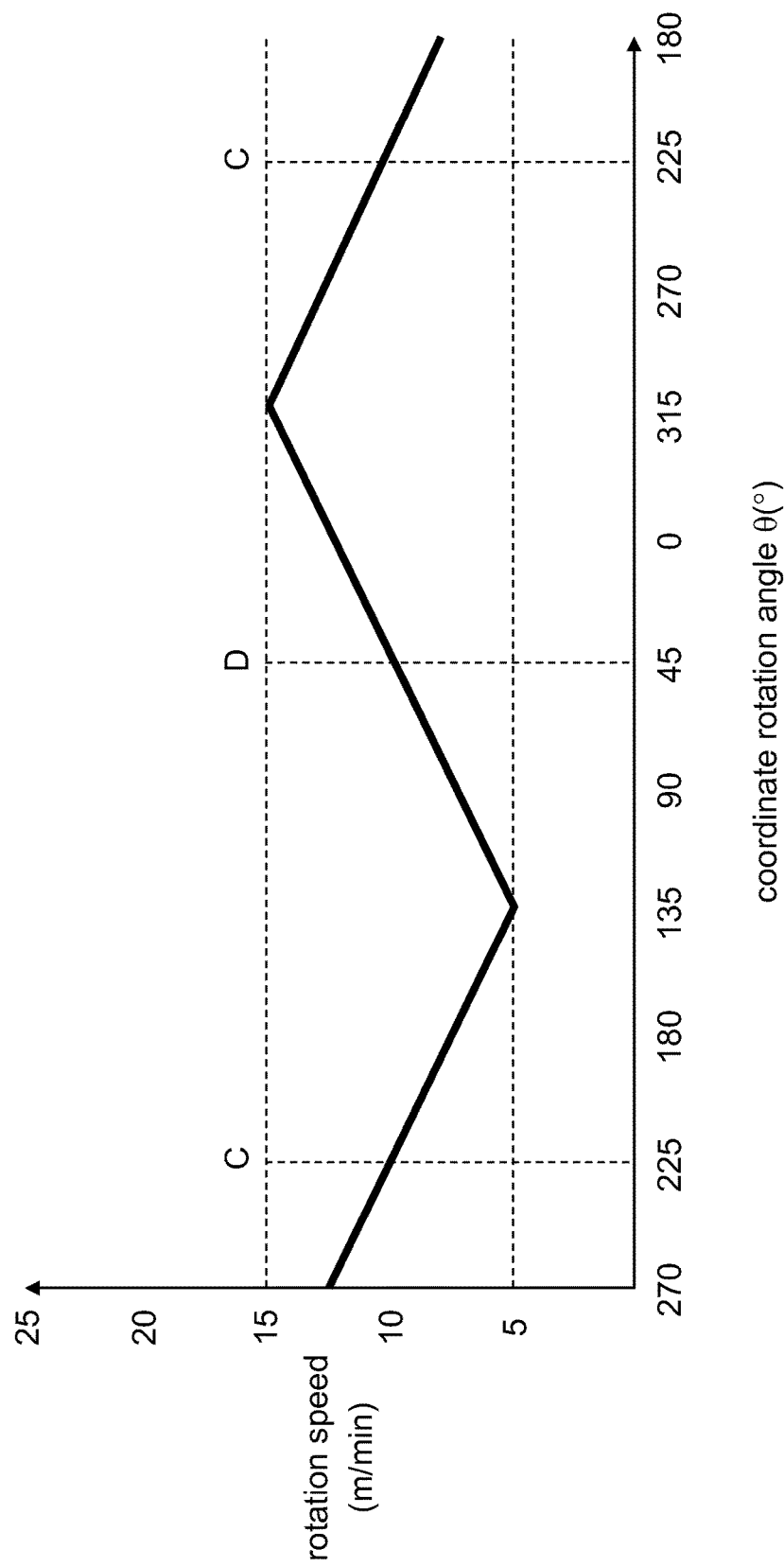
FIG. 20 is a graph showing a waveform of the rotation speed of the laser beam, which changes in a mountain shape with respect to the coordinate rotation angle θ in accordance with the second exemplary embodiment.

In order to carry out such distribution of energy of a laser beam, laser output control as shown in FIG. 13 to 17 or rotation speed control as shown in FIGS. 18 to 20 may be carried out. FIGS. 13 to 17 are graphs showing laser output of a laser beam in which the coordinate rotation angle θ is shifted by 45° from the coordinate rotation angle θ shown in FIGS. 4 to 8 of the first exemplary embodiment. FIGS. 18 to 20 are graphs showing rotation speed of a laser beam in which the coordinate rotation angle θ is shifted by 45° from the coordinate rotation angle θ shown in FIGS. 9 to 11 of the first exemplary embodiment. Thus, the total amount of energy (first energy) given to left processing region 24, which is the left side with respect to the welding proceeding direction, can be made larger than the total amount of energy (second energy) given to right processing region 25, which is the right side with respect to the welding proceeding direction. Furthermore, the total amount of energy (third energy) given to the front side in the welding proceeding direction can be made larger than the total amount of energy (fourth energy) given to the rear side. Note here that similar to the first exemplary embodiment, the upper and lower limits of energy of laser beam 8, and the upper and lower limits of the rotation speed are not necessarily limited to these values. Furthermore, the laser output and the rotation speed of the laser beam are changed in places at the coordinate rotation angle θ of 45° and 225°. However, the places are not limited to these alone, as long as the above-mentioned energy relation is consequently satisfied in the right-and-left direction and the forward-and-backward direction with respect to the welding proceeding direction.

In this exemplary embodiment, energy is changed at positions of the coordinate rotation angles θ of 45° and 225°. However, asymmetry in energy in the right-and-left direction with respect to the welding proceeding direction is largely influenced by the movement speed toward the welding proceeding direction. Therefore, as shown in FIG. 21, when the movement speed toward the welding proceeding direction is fast, it is preferable that the coordinate rotation angle θ at which energy is changed is 45° to 90° and 225° to 270°. That is to say, it is preferable to perform the controlling which puts importance on suppressing the asymmetry in energy in the right-and-left direction with respect to the welding proceeding direction. On the contrary, when the movement speed toward the welding proceeding direction is slow, it is preferable that the coordinate rotation angle θ at which energy is changed is 0° to 45° and 180° to 225°. That is to say, it is preferable to perform the controlling which puts importance on balance of energy in the forward-and-backward direction in the welding proceeding direction.

Thus, the workpiece melts equally right and left with respect to the center line of a region to be irradiated with a laser beam. Consequently, the tolerance to deviation from the target of laser beam irradiation also becomes equal right and left. Furthermore, since the workpiece melts equally right and left, the burn-through of the workpiece can be suppressed. Furthermore, heat input to the unmelted portion of workpiece 9 is enhanced, and heat input to the melted portion or the heated portion of workpiece 9 can be suppressed.

Third Exemplary Embodiment

Next, a third exemplary embodiment of the present disclosure is described with reference to FIG. 22. In this exemplary embodiment, the same reference numerals are given to the same parts of the first exemplary embodiment, and detail description thereof is omitted. Similar to the second exemplary embodiment, the third exemplary embodiment is different from the first exemplary embodiment in that energy of a laser beam in the forward-and-backward direction of the welding proceeding direction is further considered. In addition, the third exemplary embodiment is different from the second exemplary embodiment in that the total amount of energy of the laser beam given to the rear side in the welding proceeding direction is made to be larger than the total amount of energy of the laser beam given to the front side in the welding proceeding direction. Similar to the second exemplary embodiment, this exemplary embodiment is not intended that heat input by irradiation of a laser beam is carried out symmetrically in the forward-and-backward direction of the welding proceeding direction, but intended to obtain suitable balance of heat input in the forward-and-backward direction.

When workpiece 9 is, for example, galvanized steel sheet, rapid application of high heat amount makes zinc vapor spout so as to generate large-size spatters, or causes internal defects such as pits and blowholes. Therefore, it is preferable that preheating with reduced heat amount is carried out in the front side of the welding proceeding direction so as to evaporate zinc vapor, and production welding is carried out in the rear side. Therefore, it is preferable to enhance heat input to the rear side in the welding proceeding direction. In other words, it is preferable that energy (fourth energy) of the laser beam in the range of the coordinate rotation angle θ of 0° to 180° (by way of 270° because this direction is clockwise), that is, in the rear side in the welding proceeding direction, is larger than energy (third energy) of the laser beam in the range of the coordinate rotation angle θ of 180° to 0° (by way of 90° because the direction is clockwise), that is, in the front side in the welding proceeding direction.

Figure 22:
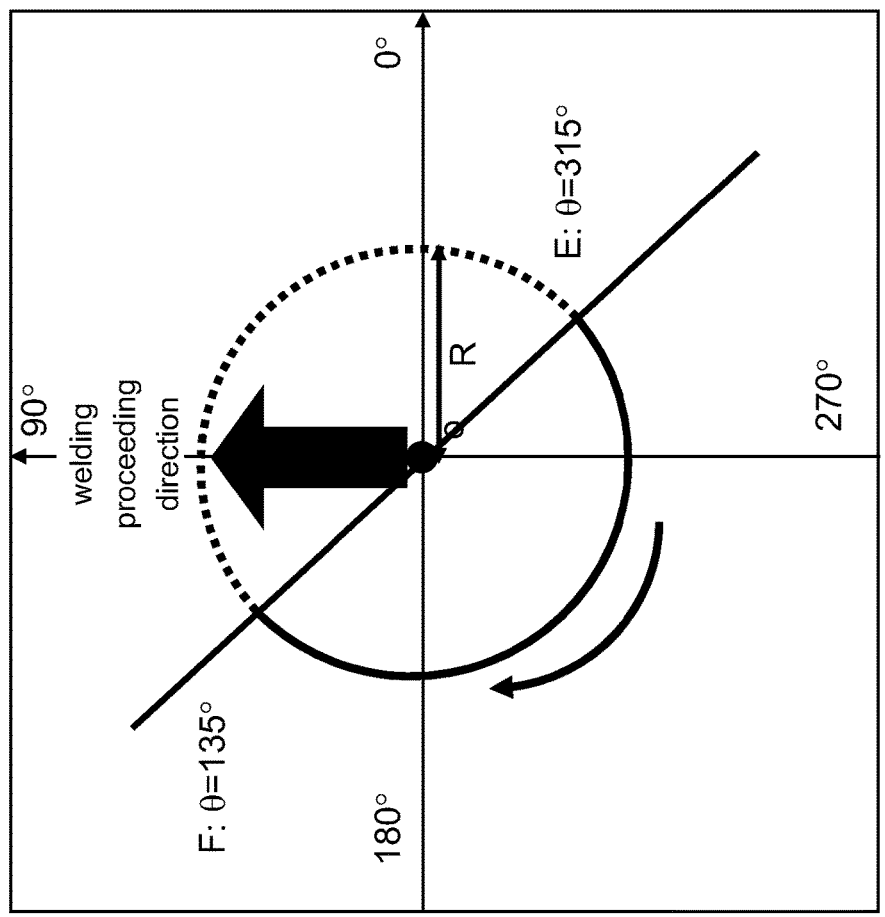
FIG. 22 is a view showing energy of a laser beam in a circular trajectory in accordance with a third exemplary embodiment.

FIG. 22 is a view showing energy of laser beam 8 in a circular trajectory in accordance with this exemplary embodiment. As shown in FIG. 22, in the laser welding method in accordance with this exemplary embodiment, energy of the laser beam is made to be higher in the rear side in the welding proceeding direction and the left side with respect to the welding proceeding direction. For example, as shown in FIG. 22, energy of laser beam 8 shown by a solid line in a range of the coordinate rotation angle θ from 315° (E in FIG. 22) to 135° (F in FIG. 22) (by way of 225° because the direction is clockwise) is higher than energy of laser beam 8 shown by a dotted line in a range of the coordinate rotation angle θ from 135° to 315° (by way of 45° because the direction is clockwise).

In order to carry out such distribution of energy of the laser beam, laser output control or rotation speed control as shown in the first and second exemplary embodiments may be carried out. Thus, the total amount of energy (first energy) given to left processing region 24, which is the left side with respect to the welding proceeding direction, can be made to be larger than the total amount of energy (second energy) given to right processing region 25, which is the right side with respect to the welding proceeding direction, and, then, the total amount of energy (fourth energy) given to the rear side in the welding proceeding direction can be made to be larger than the total amount of energy (third energy) given to the front side in the welding proceeding direction. Note here that similar to the first and second exemplary embodiments, the upper and lower limits of laser output from laser beam 8, and the upper and lower limits of the rotation speed are not necessarily limited to these values. Furthermore, in the description, the laser output and the rotation speed of a laser beam are changed in places at the coordinate rotation angle θ of 315° and 135°. However, the places are not limited to this alone, as long as the above-mentioned energy relation is consequently satisfied in the right-and-left direction and the forward-and-backward direction with respect to the welding proceeding direction.

In this exemplary embodiment, energy is changed at positions of the coordinate rotation angles θ of 315° and 135°. However, asymmetry in energy in the right-and-left direction with respect to the welding proceeding direction is largely influenced by the movement speed toward the welding proceeding direction. Therefore, when the movement speed toward the welding proceeding direction is fast, it is preferable that the coordinate rotation angle θ at which energy is changed is 90° to 135° and 270° to 315°. That is to say, it is preferable to perform the controlling which puts importance on suppressing the asymmetry in energy in the right-and-left direction with respect to the welding proceeding direction. On the contrary, when the movement speed toward the welding proceeding direction is slow, it is preferable that the coordinate rotation angle θ at which energy is changed is 135° to 180° and 315° to 0° (360°). That is to say, it is preferable to perform the controlling which puts importance on balance of energy in the forward-and-backward direction with respect to the welding proceeding direction.

Thus, the workpiece melts equally right and left with respect to the center line of a region to be irradiated with a laser beam. Consequently, the tolerance to deviation from the target of laser beam irradiation also becomes equal right and left. Furthermore, since the workpiece melts equally right and left, the burn-through of the workpiece can be suppressed. Furthermore, zinc vapor can be also appropriately discharged to workpiece 9 such as galvanized steel sheet.

Fourth Exemplary Embodiment

The second exemplary embodiment considers both the right-and-left direction and the forward-and-backward direction of the welding proceeding direction. However, when left-right left asymmetry in energy of laser beam 8 is not important, energy only in the forward-and-backward direction may be considered.

Figure 23:
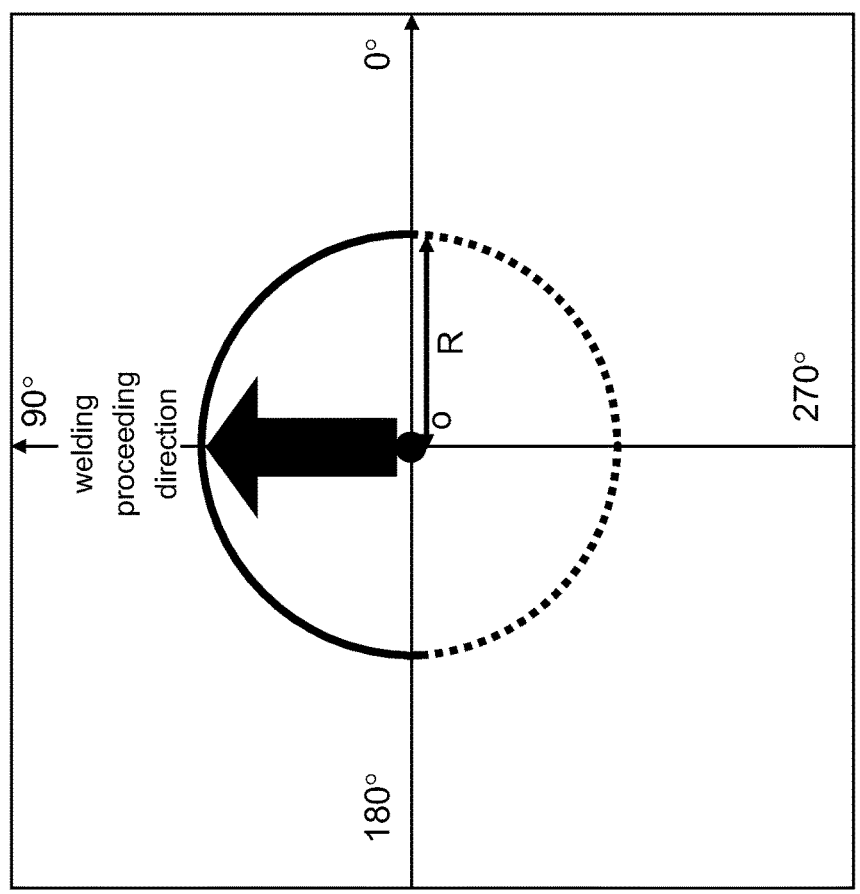
FIG. 23 is a view showing energy of a laser beam in a circular trajectory in accordance with a fourth exemplary embodiment.

This exemplary embodiment is described with reference to FIG. 23. FIG. 23 is a view showing energy of laser beam 8 in a circular trajectory in accordance with this exemplary embodiment. As shown in FIG. 23, in the laser welding method in accordance with this exemplary embodiment, energy of the laser beam is enhanced only in the front side in the welding proceeding direction. As shown in FIG. 23, energy of laser beam 8 shown by a solid line in a range of the coordinate rotation angle θ from 180° to 0° (by way of 90° because the direction is clockwise) is higher than energy of laser beam 8 shown by a dotted line in a range of the coordinate rotation angle θ from 0° to 180° (by way of 270° because the direction is clockwise).

In order to carry out such distribution of energy of the laser beam, laser output control or rotation speed control as shown in the first and second exemplary embodiments may be carried out. Thus, the total amount of energy (third energy) given to the front side in the welding proceeding direction can be made to be larger than the total amount of energy (fourth energy) given to the rear side in the welding proceeding direction. Note here that similar to the first and second exemplary embodiments, the upper and lower limits of laser output from laser beam 8, and the upper and lower limits of the rotation speed are not necessarily limited to these values. Furthermore, in the description, the laser output and the rotation speed of the laser beam are changed in places at the coordinate rotation angles θ of 0° and 180°. However, the places are not necessarily limited thereto, as long as the above-mentioned energy relation is consequently satisfied in the forward-and-backward direction with respect to the welding proceeding direction.

This can enhance heat input to an unmelted portion of workpiece 9, and suppress heat input to a melted portion or the heated portion of workpiece 9.

Fifth Exemplary Embodiment

The third exemplary embodiment considers both the right-and-left direction and the forward-and-backward direction of the welding proceeding direction. However, when left-right left asymmetry in energy of laser beam 8 is not important, energy only in the forward-and-backward direction may be considered.

Figure 24:
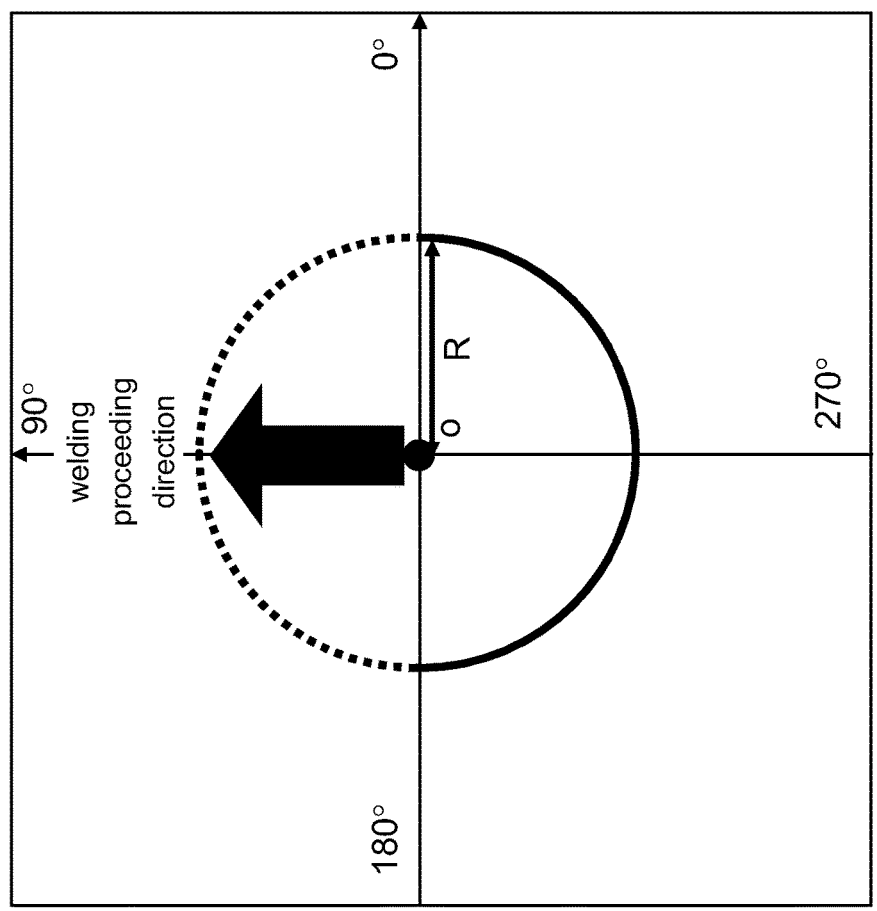
FIG. 24 is a view showing energy of a laser beam in a circular trajectory in accordance with a fifth exemplary embodiment.

This exemplary embodiment is described with reference to FIG. 24. FIG. 24 is a view showing energy of laser beam 8 in a circular trajectory in accordance with this exemplary embodiment. As shown in FIG. 24, in the laser welding method in accordance with this exemplary embodiment, energy of laser beam is enhanced only in the rear side in the welding proceeding direction. As shown in FIG. 24, energy of laser beam 8 shown by a solid line in a range of the coordinate rotation angle θ from 0° to 180° (by way of 270° because the direction is clockwise) is higher than energy of laser beam 8 shown by a dotted line in a range of the coordinate rotation angle θ from 180° to 0° (by way of 90° because the direction is clockwise).

In order to carry out such distribution of energy of a laser beam, laser output control or rotation speed control as shown in the first and second exemplary embodiments may be carried out. Thus, the total amount of energy (fourth energy) given to the rear side in the welding proceeding direction can be made to be larger than the total amount of energy (third energy) given to the front side in the welding proceeding direction. Note here that similar to the first and second exemplary embodiments, the upper and lower limits of the laser output from laser beam 8, and the upper and lower limits of the rotation speed are not necessarily limited to these values. Furthermore, in the description, the laser output and the rotation speed of the laser beam are changed in places at the coordinate rotation angle θ of 0° and 180°. However, the places are not necessarily limited thereto, as long as the above-mentioned energy relation is consequently satisfied in the forward-and-backward direction with respect to the welding proceeding direction.

Since this prevents generation of spatters or internal defects such as pits and blowholes even when workpiece 9 is galvanized steel sheet, preheating with the heat amount suppressed is carried out in the front side in the welding proceeding direction so as to evaporate zinc vapor.

Note here that the first to fifth exemplary embodiments describe an example in which the circular trajectory of the irradiation position of laser beam 8 is rotated in the right hand (clockwise rotation), but it may be rotated in the left hand rotation (counterclockwise rotation). In the first to third exemplary embodiments, even in the left-handed rotation, a total amount of energy of laser beam 8 in a side in which the movement speed in the circular trajectory of laser beam 8 includes a component of the welding proceeding direction is only required to be larger than a total amount of energy of laser beam 8 in a side in which the movement speed in the circular trajectory of laser beam 8 includes a component of an opposite direction to the welding proceeding direction.

Furthermore, in the first to fifth exemplary embodiments, a total amount of energy of laser beam 8 is changed by changing any one of the laser output or the rotation speed of laser beam 8, but both the laser output and the rotation speed may be combined with each other. Furthermore, in the case where the laser output and the rotation speed of laser beam 8 are combined with each other, as long as the total amount of energy is controlled to the above-mentioned relation, the relation whether the size relation of the laser output or the speed relation of the rotation speed may be opposite relation to that of the first to third exemplary embodiments. For example, in the first exemplary embodiment, even if the rotation speed in left processing region 24 is faster than the rotation speed in right processing region 25, when the laser output in left processing region 24 is made to be larger than the laser output in right processing region 25, the total amount of energy given to left processing region 24 may be consequently larger than the total amount of energy given to right processing region 25.

INDUSTRIAL APPLICABILITY

According to a laser welding method of the present disclosure, a workpiece melts equally right and left with respect to the center line of a region to be irradiated with a laser beam. Consequently, tolerance to deviation from a target of laser beam irradiation is also equal right and left. Furthermore, since the workpiece melts equally right and left, burn-through of the workpiece can be suppressed. Thus, the laser welding method of the present disclosure is industrially applicable.

The invention claimed is:

1. A laser welding method comprising:
   irradiating a workpiece with a laser beam in a helical shape along a weld part of the workpiece,
   wherein the helical shape is a combination of a plurality of circular trajectories in which the laser beam is moved circularly, and a movement trajectory in which the laser beam is moved in a proceeding direction along the weld part,
   a first energy of the laser beam moving so as to have a component of the proceeding direction in one circular trajectory of the plurality of circular trajectories as a first circular trajectory is larger than a second energy of the laser beam moving so as to have a component of an opposite direction to the proceeding direction in the first circular trajectory, and
   a first rotation angle range in which the laser beam is irradiated with the first energy and a second rotation angle range in which the laser beam is irradiated with the second energy are provided in each of the plurality of circular trajectories as the first circular trajectory,
   wherein when assuming that the direction in which the rotation angle is 90° is the proceeding direction and that the rotation direction is clockwise rotation, a range of the first rotation angle is in the range of 270° to 90°, a range of the second rotation angle is in the range of 90° to 270°, and at least the first energy in the range of the first rotation angle is constant.

2. The laser welding method of claim 1, wherein a third energy of the laser beam in a front side of the workpiece in the proceeding direction in the one circular trajectory as the first circular trajectory of the plurality of circular trajectories is larger than a fourth energy of the laser beam in a rear side of the workpiece on an opposite side to the proceeding direction in the first circular trajectory.

3. The laser welding method of claim 2, wherein the third energy and the fourth energy are controlled by changing at least one selected from a group consisting of an output of the laser beam and a rotation speed of the laser beam in the circular trajectory.

4. The laser welding method of claim 3, wherein a waveform of the output of the laser beam has a rectangular shape, a trapezoidal shape, or a mountain shape.

5. The laser welding method of claim 1, wherein a third energy of the laser beam in a front side of the workpiece in the proceeding direction in the one circular trajectory of the plurality of circular trajectories as the first circular trajectory is smaller than a fourth energy of the laser beam in a rear side of the workpiece on an opposite side to the proceeding direction in the first circular trajectory.

6. The laser welding method of claim 5, wherein the workpiece is a galvanized steel sheet.

7. The laser welding method of claim 1, wherein the first energy and the second energy are controlled by changing at least one selected from a group consisting of the output of the laser beam and the rotation speed of the laser beam in the circular trajectory.

8. The laser welding method of claim 1,
   wherein the first circular trajectory and another first circular trajectory adjacent to the first circular trajectory overlap each other.

9. The laser welding method of claim 1, wherein the laser beam is a continuous wave,
   the energy of the laser beam is constant with respect to the rotation angle in a certain angular range, and
   the energy of the laser beam changes in a rectangular shape with respect to a rotation angle.

10. The laser welding method of claim 1, wherein the laser beam is a continuous wave,
    the energy of the laser beam is constant with respect to the rotation angle in a certain angular range, and
    the energy of the laser beam changes in a trapezoidal shape with respect to a rotation angle.

11. The laser welding method of claim 1, wherein
    the laser beam is a combination of a continuous wave and a pulse wave, and
    a wave form of the energy of the laser beam is a combination of the pulse wave and the continuous wave with respect to the rotation angle.

12. A laser welding method comprising:
    irradiating a workpiece with a laser beam in a helical shape along a weld part of the workpiece,
    wherein the helical shape is a combination of a plurality of circular trajectories in which the laserbeam is moved circularly, and a movement trajectory in which the laser beam is moved in a proceeding direction along the weld part,
    a first energy of the laser beam in a front side of the workpiece in the proceeding direction in one circular trajectory of the plurality of circular trajectories as the first circular trajectory is larger than a second energy of the laser beam in a rear side of the workpiece in an opposite direction to the proceeding direction in the first circular trajectory, and
    a first rotation angle range in which the laser beam is irradiated with the first energy in the front side of the workpiece in the proceeding direction and a second rotation angle range in which the laser beam is irradiated with the second energy in the rear side of the workpiece in the opposite direction to the proceeding direction are provided in each of the plurality of circular trajectories as the first circular trajectory,
    wherein when assuming that the direction in which the rotation angle is 90° is the proceeding direction and that the rotation direction is clockwise rotation, a range of the first rotation angle is in the range of 180° to 0°, a range of the second rotation angle is in the range of 0° to 180°, and at least the first energy in the range of the first rotation angle is constant.

13. A laser welding method comprising:
    irradiating a workpiece with a laser beam in a helical shape along a weld part of the workpiece,
    wherein the helical shape is a combination of a plurality of circular trajectories in which the laser beam is moved circularly, and a movement trajectory in which the laser beam is moved in a proceeding direction along the weld part,
    a first energy of the laser beam in a front side of the workpiece in the proceeding direction in one circular trajectory of the plurality of circular trajectories as a first circular trajectory is smaller than a second energy of the laser beam in a rear side of the workpiece in an opposite direction to the proceeding direction in the first circular trajectory, and a first rotation angle range in which the laser beam is irradiated with the first energy in the front side of the workpiece in the proceeding direction and a second rotation angle range in which the laser beam is irradiated with the second energy in the rear side of the workpiece in the opposite direction to the proceeding direction are provided in each of the plurality of circular trajectories as the first trajectory, wherein when assuming that the direction in which the rotation angle is 90° is the proceeding direction and that the rotation direction is clockwise rotation, a range of the first rotation angle is in the range of 180° to 0°, a range of the second rotation angle is in the range of 0° to 180°, and at least the first energy in the range of the first rotation angle is constant.

* * * * *